US009366195B2

(12) United States Patent
Wager et al.

(10) Patent No.: US 9,366,195 B2
(45) Date of Patent: Jun. 14, 2016

(54) FUEL INJECTION VALVE AND METHOD OF ACTUATING

(71) Applicant: Westport Power Inc., Vancouver (CA)

(72) Inventors: David R. Wager, Vancouver (CA); Gordon P. McTaggart-Cowan, Vancouver (CA); David K. Mumford, Vancouver (CA); Sandeep Munshi, Delta (CA)

(73) Assignee: WESTPORT POWER INC. (CA)

( * ) Notice: Subject to any disclaimer, the term of this patent is extended or adjusted under 35 U.S.C. 154(b) by 0 days.

(21) Appl. No.: 14/578,000

(22) Filed: Dec. 19, 2014

(65) Prior Publication Data

US 2015/0115055 A1 Apr. 30, 2015

Related U.S. Application Data

(63) Continuation of application No. PCT/CA2013/050424, filed on Jun. 3, 2013.

(30) Foreign Application Priority Data

Jun. 21, 2012 (CA) ..................................... 2780864

(51) Int. Cl.
*B05B 1/30* (2006.01)
*F02D 19/02* (2006.01)
(Continued)

(52) U.S. Cl.
CPC .......... *F02D 19/024* (2013.01); *F02D 19/0647* (2013.01); *F02M 21/0254* (2013.01);
(Continued)

(58) Field of Classification Search
CPC ... F02M 43/04; F02M 45/086; F02M 47/027; F02M 63/029; F02D 19/0684; F02D 19/0694; F02D 19/10

USPC .............. 239/585.1, 585.3, 585.4, 585.5, 584
See application file for complete search history.

(56) References Cited

U.S. PATENT DOCUMENTS 5,887,799 A 3/1999 Smith
6,298,829 B1 10/2001 Welch et al.
(Continued)

FOREIGN PATENT DOCUMENTS

CA 2767247 A1 4/2012
DE 102006038536 A1 2/2008
(Continued)

OTHER PUBLICATIONS

International Search Report and Written Opinion of the International Searching Authority issued on Jul. 30, 2013, in connection with International Application No. PCT/CA2013/050424.
(Continued)

*Primary Examiner* — Davis Hwu
(74) *Attorney, Agent, or Firm* — Carie Mager

(57) ABSTRACT

A fuel injection valve injects a fuel into the combustion chamber or into the injection port of an internal combustion engine, the valve being actuated by an actuator assembly that includes a small displacement actuator and a large displacement actuator. The method includes commanding the small displacement actuator to move the valve member to a first open position corresponding to a first flow area and commanding the large displacement actuator to move the valve member to a second open position corresponding to a second flow area that is larger than the first flow area such that the ratio between the second flow area and the first flow area is at least 15:1. The fuel injection valve can also be operated to alternatively inject two different fuels, one of the fuels being a gaseous fuel and the other one being a liquid fuel.

20 Claims, 9 Drawing Sheets

(51) Int. Cl.
*F02D 19/06* (2006.01)
*F02M 21/02* (2006.01)
*F02M 51/06* (2006.01)
*F02M 61/04* (2006.01)
*F02M 43/04* (2006.01)

(52) U.S. Cl.
CPC .......... *F02M21/0263* (2013.01); *F02M 43/04* (2013.01); *F02M 51/0607* (2013.01); *F02M 51/0632* (2013.01); *F02M 61/04* (2013.01); *F02M 21/0269* (2013.01); *Y02T 10/32* (2013.01); *Y02T 10/36* (2013.01)

(56) References Cited

U.S. PATENT DOCUMENTS

| | | | |
|---|---|---|---|
| 6,302,341 | B1 | 10/2001 | Yoo |
| 7,527,041 | B2 | 5/2009 | Wing et al. |
| 2003/0010848 | A1 | 1/2003 | Laumen |
| 2007/0152084 | A1* | 7/2007 | Boecking ........... F02M 51/0603 239/533.2 |
| 2009/0108095 | A1 | 4/2009 | Ruiz |
| 2009/0321668 | A1* | 12/2009 | Venkataraghavan . F02M 47/027 251/129.01 |
| 2011/0005499 | A1 | 1/2011 | Buckner et al. |
| 2011/0108631 | A1 | 5/2011 | Mumford et al. |
| 2011/0240770 | A1 | 10/2011 | Straub |
| 2012/0080011 | A1* | 4/2012 | Cooke ................. F02M 45/086 123/472 |
| 2012/0255523 | A1 | 10/2012 | Kim et al. |
| 2012/0285417 | A1* | 11/2012 | Kim .................... F02D 19/0684 123/299 |

FOREIGN PATENT DOCUMENTS

| | | |
|---|---|---|
| EP | 1619385 A1 | 1/2006 |
| EP | 2060774 A1 | 5/2009 |
| GB | 2341893 A | 3/2000 |

OTHER PUBLICATIONS

International Preliminary Report on Patentability and Written Opinion of the International Bureau issued on Dec. 23, 2014, in connection with International Application No. PCT/CA2013/050424.
Office Action issued on Sep. 26, 2012, in connection with Canadian Patent Application No. 2,780,861.
Supplementary European search report issued on Feb. 9, 2016, in connection with European patent application (publication No. 2864622) which is the EP national stage application of subject parent application PCT/CA20130/50424.

* cited by examiner

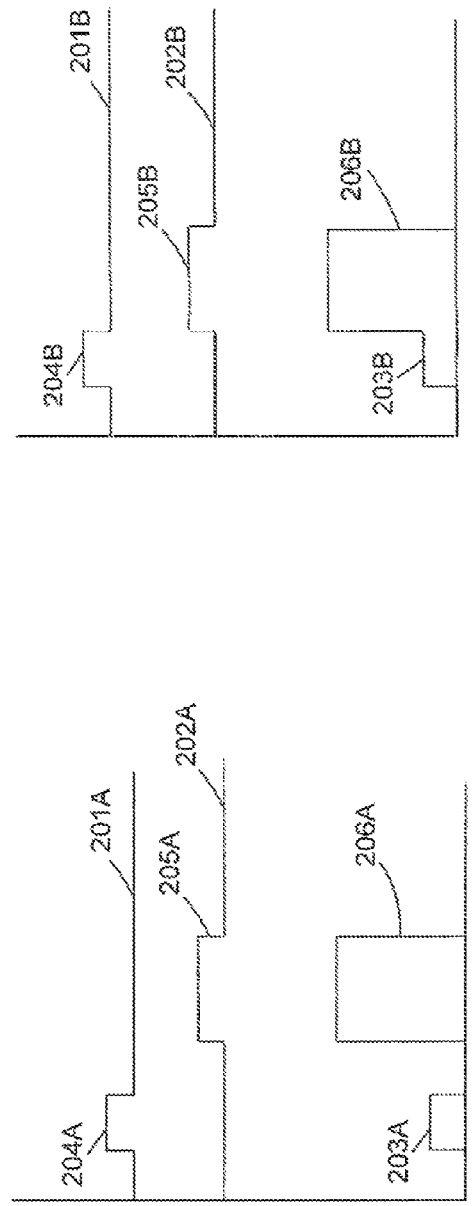
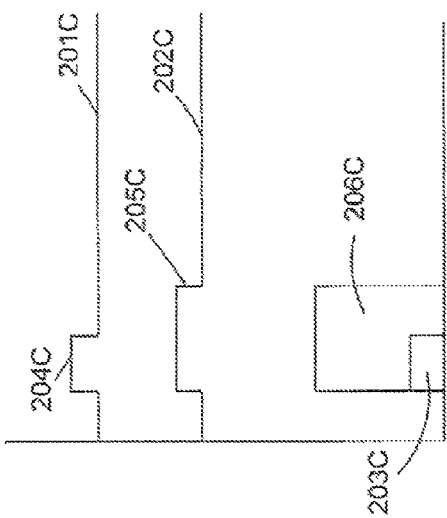
Figure 2A
Figure 2B
Figure 2C

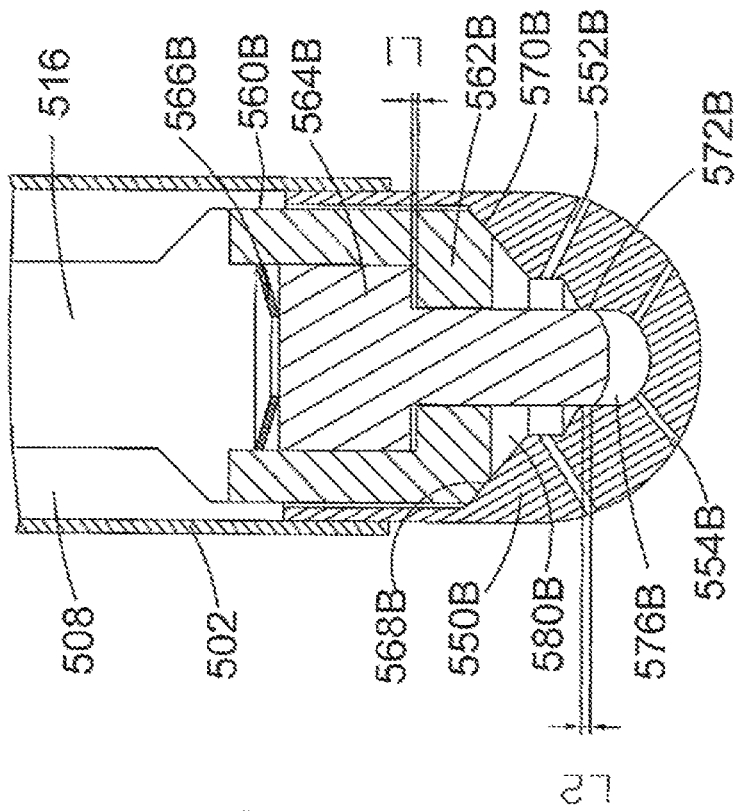
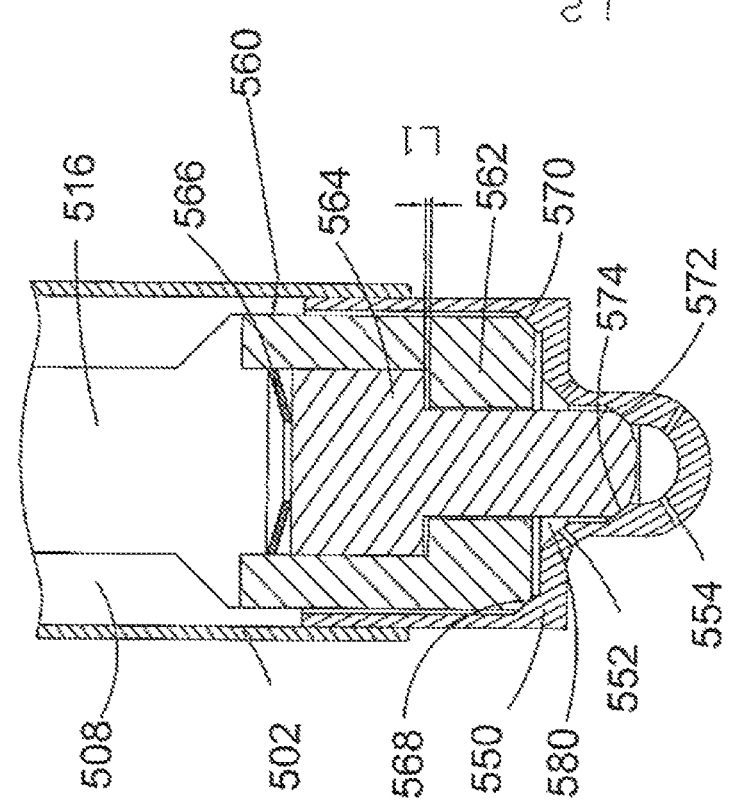

FUEL INJECTION VALVE AND METHOD OF ACTUATING

CROSS-REFERENCE TO RELATED APPLICATIONS

This application is a continuation of International Application No. PCT/CA2013/050424 having a filing date of Jun. 3, 2013, entitled "Fuel Injection Valve and Method of Actuating", which is related to and claims priority benefits from Canadian patent application No. 2,780,864 filed on Jun. 21, 2012, also entitled "Fuel Injection Valve and Method of Actuating". The '424 international application is hereby incorporated by reference herein in its entirety.

FIELD OF THE INVENTION

The present invention relates to a fuel injection valve actuated by an actuator assembly that includes two different types of actuators which enables operating the fuel injection valve with a broader range of fluid flow area.

BACKGROUND OF THE INVENTION

Mainstream internal combustion engines are engines fuelled by one fuel, typically a liquid fuel like diesel or gasoline. However, liquid fuelled internal combustion engines generate a considerable share of pollutants released into the environment, such as oxides of nitrogen (NOx) and particulate matter (PM). Such emissions can be reduced by substituting some of the diesel or gasoline with cleaner-burning gaseous fuels such as natural gas, pure methane, ethane, liquefied petroleum gas, lighter flammable hydrocarbon derivatives, hydrogen, and blends of such fuels. Gaseous fuels are generally defined herein as fuels that are gaseous at atmospheric pressure and zero degrees Celsius.

An advantage of some of these gaseous fuels is that, as a resource, they are more widely distributed around the world and with respect to natural gas, the amount of proven reserves is much greater, compared to proven oil reserves. Methane can also be collected from renewable sources such as vent gases from garbage dumps, sewage treatment plants and agricultural operations. Hydrogen can be produced with electricity generated from renewable sources such as wind mills and hydro-electric dams.

However the fuelling infrastructure for gaseous fuels is still under development. Therefore it can be advantageous for automotive manufacturers to offer engines that have the flexibility to be fuelled with either a conventional liquid fuel or a less expensive and cleaner burning gaseous fuel. In this disclosure an engine with this fuel flexibility, for example that can be fuelled with either gasoline or natural gas is defined as a "bi-fuel" engine. This is to distinguish bi-fuel engines from dual fuel engines which are defined herein to mean engines that can be fuelled with two different fuels at the same time.

Possible arrangements for bi-fuel engines include injecting either natural gas or liquid fuel directly in the combustion chamber of the engine or in the engine's air intake port. The fuels have different fluid properties, including for example, gaseous fuels being compressible fluids versus liquid fuels being virtually incompressible, and significant differences and variability in mass densities resulting from the compressibility of gaseous fuels. While fuel injection valves for liquid fuels and gaseous fuels exist today, a fuel injection valve designed for liquid fuel is not suitable for injecting the same amount of energy when fuelling an engine with a gaseous fuel. Conventional bi-fuel engines normally use separate fuel-specific fuel injectors, but this requires finding space to mount two different fuel injection valves and can be a problem, for example if it is desired to inject both fuels directly into the combustion chamber. Using a single injection valve for alternatively injecting a gaseous fuel or a liquid fuel is an advantageous solution when one considers the space limitations of conventional engines.

While gaseous fuels and liquid fuels have generally the same energy density (the amount of energy per unit mass), they have very different mass densities (the mass per unit volume), with the mass density of gaseous fuels being much lower than that of liquid fuels. The mass flow rate of a fluid depends on the mass density p, the available flow area A, and the fluid velocity or discharge speed V according to the formula:

$$\dot{m} = \rho V A$$

Furthermore, since gaseous fuels are compressible fluids, their mass densities decrease linearly with decreasing pressure. Liquid fuels such as gasoline and diesel fuel are virtually incompressible fluids so unlike gaseous fuels, their mass densities do not change significantly as a function of pressure. For fluids, discharge speed V is a function of fluid supply pressure. Therefore, for equal flow areas and equal discharge speed, the mass flow rate for a gaseous fuel is much lower than that for a liquid fuel and the difference in mass flow rate becomes increasingly large as fuel supply pressure decreases. For example, at fuel supply pressures of 20 to 40 bar it is estimated that, for same injector parameters, the mass flow ratio of liquid to gas can be between 10 to 15:1.

Upon activating the actuator of a fuel injection valve, the valve member is moved to an open position that corresponds to a displacement of the actuator and allows fuel to flow through a first flow area created between the valve member and the valve seat to be injected into the combustion chamber of an internal engine, for example, at a first mass flow rate. Most conventional directly actuated fuel injection valves which are actuated by a solenoid only have one open position. For fuel injection valves actuated by a strain-type actuator more than one displacement can be commanded in which case, if a higher mass flow rate is required, the actuator can be activated to move the valve member to a second open position that corresponds to a larger flow area for injecting fuel at a higher mass flow rate. The mass ratio between the maximum and minimum fuel mass that can be injected by a fuel injection valve is called the turn down ratio. The turn down ratio is directly related to the ratio between maximum fluid flow area and minimum fluid flow area that can be achieved within an injector if the other injector, fuel, and engine parameters are kept constant. Because of the difference in mass flow rates through a given flow area between liquid fuel and gaseous fuel, it is advantageous for the injection valve employed for a bi-fuel engine operation to have a broader range of flow areas than the existing conventional fuel injection valves.

For an existing gasoline direct injection valve, for example, having a 3 mm contact diameter at the seat and employing a piezoelectric actuator that can achieve a nominal full lift of 30 to 50 microns and a partial lift of 5 to 10 microns, the ratio between the largest and the smallest flow areas achieved by the injector generally is between 3:1 and 10:1. Injection valves actuated by an electromagnetic actuator do not enable an active lift control to achieve intermediate lifts and therefore operate only between a closed and one open position.

What prevents conventional fuel injection valves from being employed as a bi-fuel injection valve is the limited range of fluid flow area. A bi-fuel injection valve needs to be capable of injecting the required amount of liquid fuel at low or idle operating conditions and the required amount of gaseous fuel at high load operating conditions. This is a very different requirement and problem than that addressed by conventional single fuel injection valves.

The "flow area" of an injector is defined herein to mean the flow area that controls the fluid flow rate during an injection event. In preferred embodiments, the flow area is the minimum cross-sectional area of the passage created when the valve member is lifted from the valve seat.

In the past, various strategies have been employed to achieve desired turn down ratios for single fuel injection valves but these strategies alone, individually or in combination, are not enough to achieve the order of magnitude difference in the range of fluid flow area that is needed for a fuel injection valve designed for switching between injecting one of either a liquid fuel or a gaseous fuel. Some of these conventional strategies include controlling the pulse width of the injection event, the fuel supply pressure or the injection valve needle lift.

The "pulse width" of an injection event is understood to be the time the fuel injection valve is open to allow fuel to be injected into the engine cylinder. Assuming a constant fuel pressure, a constant valve needle lift and a constant fuel density, a longer pulse width generally results in a larger mass of fuel being introduced into the combustion chamber. When the engine operates at idle or at low loads, the quantity of fuel required is less than what is required for other operating conditions, necessitating a shorter pulse width, which can be difficult to consistently repeat, and can then lead to variability in the amount of fuel injected. At high loads or high speeds, the pulse width can be limited by the available time for injecting the desired amount of fuel within the timing that achieves efficient fuel mixing and combustion. Accordingly, there are limits on the turn down ratio that can be achieved by only adjusting pulse width.

Adjusting the fuel supply pressure for achieving a high turn-down ratio typically results in reducing the fuel supply pressure at idle or low load and increasing the fuel supply pressure at higher engine speeds or at high loads. Reducing the liquid fuel supply pressure can be relatively easily resolved, for example, by returning a portion of the high-pressure fuel to the tank, but lowering liquid fuel supply pressure too much can inhibit the atomization of the fuel. Operating with a variable gaseous fuel supply pressure can require an additional compressor or a pump, adding to the system's complexity. For quickly reducing the gaseous fuel supply pressure, gaseous fuel can be vented from the gaseous fuel supply system, but with some gaseous fuel delivery systems it is not possible to return the gaseous fuel to the fuel storage tank, so unless the vented gaseous fuel can be captured or used by another system, some fuel might be vented into the atmosphere, which is wasteful, undesirable, and in some applications there are regulations that prohibit this.

Some types of fuel injection valves can control valve needle lift to influence the quantity of fuel that is introduced into a combustion chamber. An increase in needle lift generally corresponds to an increase in the quantity of fuel being injected. Fuel injection valves can employ a mechanical or an electrical actuator that is controllable to lift and hold the needle at intermediate positions between the closed and fully open position. Piezoelectric actuators are known in the industry to allow control of the valve needle lift at intermediate positions between the fully closed and fully open positions of the valve. With piezoelectric, magnetostrictive, and other strain-type actuators, the stroke is generally much smaller than the stroke that can be generated by electromagnetic actuators, but, on the other hand, they can generate a higher opening force and have a faster response to the activation signal, which makes the strain-type actuators more desirable for fuel injection valve applications where faster opening and closing times contribute to a better control of the fuelling. Another advantage of some strain-type actuators, for example piezo-actuators, is that they typically consume less power than electromagnetic actuators. An example of a fuel injection valve actuated by a piezoelectric actuator is described in the applicant's co-owned U.S. Pat. No. 7,527,041.

Compared to strain-type actuators, bigger displacements of valve needles can be achieved with an electromagnetic actuator, for example a solenoid. While some development has been done for fuel injection valves directly actuated by solenoids, a challenge to broad adoption has been the size and power requirements for these types of actuators for this application. Some literature that discloses the use of solenoid actuators describe fuel injection valves that use an assembly formed by two electromagnetic actuators for achieving a two-stage lift of the valve needle. For example, United Kingdom patent application number 2,341,893 describes a two-stage lift fuel injection valve for use in a common rail fuel system, that permits the lifting of the valve needle to a first intermediate position governed by the stroke of the first electromagnetic actuator, a second intermediate position governed by the stroke of the second electromagnetic actuator and a fully lifted position achieved by the combined strokes of the first and second actuators.

While current assemblies including two solenoid actuators allow holding a fuel injection valve at a few intermediate positions between the closed and open position there is still a need for more accurate and more precise control of fuel flow over a broader range of flow areas.

SUMMARY OF THE INVENTION

A method for actuating a fuel injection valve including a valve member that can be moved between a closed position and an open position includes:
(a) biasing the valve member to a closed position at which fuel flow through the valve is blocked by applying a closing force to the valve member; and
(b) activating an actuator assembly including a large displacement actuator and a small displacement actuator which are each independently operable to produce a lift of the valve member away from a valve seat by commanding the small displacement actuator to move the member against the closing force to a first open position corresponding to a first flow area, and commanding the large displacement actuator to move the valve member against the closing force to a second open position corresponding to a second flow area that is larger than the first flow area, wherein a ratio between the second flow area and the first flow area is at least 15:1.

Modeling done using the present method of actuating the fuel injection valve has shown that the present injection valve could achieve flow area ratios higher than 10:1, which is believed to be achievable by some conventional fuel injection valves.

The disclosed injection valve can be designed for example with a ratio of at least 15:1 or 20:1 between the highest flow area and the lowest flow area. In some embodiments, when the fuel injection valve is employed for a bi-fuel operation mode to enable same fuel injection valve to inject either a conventional liquid fuel or an alternative gaseous fuel, a flow area ratio between 25:1 and 60:1 is preferred.

The method further includes transmitting displacements caused by the small displacement actuator to a valve member through a hydraulic link assembly to compensate for changes in the dimensional relationship between components of the fuel injection valve.

For a bi-fuel engine, the method includes moving the valve member to the first open position corresponding to the first flow area when injecting a first fuel and moving the valve member to the second open position which corresponds to the second flow area when injecting a second fuel, which has a lower mass density compared to the first fuel. The first fuel can be a liquid fuel selected from the group including gasoline, diesel fuel, dimethylether, bio-diesel and kerosene. The second fuel can be a gaseous fuel selected from the group including natural gas, methane, propane, butane, hydrogen and mixtures thereof.

In some embodiments, the method further includes transmitting a displacement generated by the large displacement actuator through the small displacement actuator to the valve member.

In preferred embodiments, the method includes first commanding the small displacement actuator to move the valve member to a first open position, and then commanding the large displacement actuator to move the valve member to a second open position. The large displacement actuator can be activated after the small displacement actuator is deactivated. In other embodiments, the large displacement actuator can be activated before the small displacement actuator is deactivated such that fuel is supplied continuously in one injection event.

In yet another embodiment, the method includes first commanding the large displacement actuator to move the valve member to the second open position, and then commanding the small displacement actuator to move the valve member to the first open position. The small displacement actuator can be activated after the large displacement actuator is deactivated, or it can be activated before the large displacement actuator is deactivated such that fuel is supplied continuously in one injection event.

The method can also include activating the small displacement actuator and the large displacement actuator at the same time to generate a fast initial lift of the valve member through a short activation of the strain-type actuator.

In one embodiment of the method, when the valve member is moved to a first open position, fuel is injected through a first set of orifices provided in a nozzle of the fuel injection valve and when the valve member is moved to a second open position fuel is injected through the first set of orifices and a second set of orifices provided in the nozzle.

The method can further include a step of controlling the duration of the activation time of the small displacement actuator and/or the large displacement actuator to control the duration of an injection event as a parameter for controlling the amount of fuel that is injected during an injection event.

A fuel injection valve is described which includes:
 (a) a valve body that defines a fuel cavity, the valve body including an inlet passage for delivering a fuel into the fuel cavity and a nozzle through which the fuel can exit from the fuel cavity;
 (b) a valve member disposed within the valve body wherein the valve member is movable between a closed position wherein the valve member blocks fuel from exiting the fuel cavity through the nozzle and an open position wherein the valve member and the valve body define a fluid flow area through which the fuel can exit the fuel cavity through the nozzle, and
 (c) an actuator assembly that moves the valve member between the closed position and the open position, the actuator assembly including a large displacement actuator and a small displacement actuator.

The small displacement actuator, when activated, moves the valve member to a first open position corresponding to a first flow area and the large displacement actuator, when activated, moves the valve member to a second open position corresponding to a second flow area. The disclosed injection valve can be designed for example with at least a 15:1 or 20:1 ratio between the highest flow area and the lowest flow area. In some embodiments when the fuel injection valve is employed for a bi-fuel operation mode to enable same fuel injection valve to inject either a conventional liquid fuel or an alternative gaseous fuel a flow area ratio between 25:1 and 60:1 is preferred.

The large displacement actuator and the small displacement actuator can be are arranged co-axially with the valve member.

A large displacement actuator is an actuator that can deliver displacements of a greater magnitude than a small displacement actuator. For example, for a 5 liter bi-fuel internal combustion engine with up to 8 cylinders fuelled alternatively with a gaseous fuel and a liquid fuel, the small displacement actuator could deliver displacements that are smaller than 50 microns and the large displacement actuator could deliver displacements that are larger than 200 microns. For other engines having a bigger or a smaller capacity, the actuators could be dimensioned or commanded to deliver proportionally bigger or smaller displacements. Generally, the large displacement actuator delivers a displacement that is at least four times bigger than the displacement delivered by the small displacement actuator.

The small displacement actuator can include a strain-type actuator that is a transducer selected from the group including piezoelectric, magnetostrictive, and electrostrictive transducers or it can be an actuator that includes an electroactive polymer, a shape memory alloy or rheological fluid. The large displacement actuator can be an electromagnetic actuator, for example a solenoid which is operable to move an armature which is rigidly affixed to the valve member to thereby move the valve member between the closed position and the second open position.

The small displacement actuator is capable of being activated to produce a displacement that is transmitted directly to the valve member which is thereby moved between the closed position and the first open position.

In embodiments where the large displacement actuator and the small displacement actuator are co-axial to the valve member, the small displacement actuator has generally a tubular shape and is disposed within the valve body, in an annular space surrounding the valve member. In these embodiments, the large displacement actuator can be an electromagnetic actuator which includes a coil that is disposed within the valve body, in an annular space surrounding the valve member.

The valve member of the fuel injection valve can accommodate a hydraulic link assembly, which is operable to compensate for changes in the dimensional relationship between components of the fuel injection valve. Such a hydraulic link assembly can be similar to the one described in the co-owned U.S. Pat. No. 6,298,829.

The valve body generally includes a stop, which limits the movement of the valve member.

The fuel injection valve generally includes a biasing mechanism associated with the valve member for applying a closing force to the valve member. The biasing mechanism can be a spring disposed within the valve body between the valve body and the valve member.

The fuel injection valve can further include a biasing mechanism for applying a force on the valve member for keeping it in close contact with the small displacement actuator with the biasing mechanism being disposed within the valve body between the valve body and the valve member.

The valve member of the fuel injection valve can be moved to an open position in the direction of the associated combustion chamber or of the engine's injection port or, in an alternative embodiment, the valve member is movable to the open position in the direction away from the associated combustion chamber or from the engine's injection port.

For the embodiments where the valve member is moved to an open position in a direction away from the associated combustion chamber or from the engine's injection port, the valve nozzle includes two sets of injection orifices for injecting fuel from the fuel cavity. In this embodiment, the small displacement actuator is operable to move the valve member to a first open position that allows injecting fuel from the fuel cavity through the first set of orifices and the large displacement actuator is operable to move the valve member to a second open position that allows injecting fuel from the fuel cavity through the first set of orifices and through the second set of orifices.

In one of the embodiments where the fuel injection valve includes a nozzle with two sets of injection orifices, an end of the valve member includes a hollow sleeve and a needle that can slide within the hollow sleeve. The sleeve includes an annular tapered outside surface and the nozzle includes an upper tapered inside shoulder, such that when the valve member is seated, the annular tapered outside surface of the sleeve is in contact with the upper tapered inside shoulder of the nozzle and when the valve member is lifted over a distance that is smaller than a predetermined lift "L1" fuel can flow from the fuel cavity to the first set of orifices through a fuel passage created between the annular tapered outside surface of the sleeve and the upper tapered inside shoulder of the nozzle. In this embodiment, the needle can include an outer tapered annular surface and the nozzle includes a lower tapered inside shoulder such that when the valve member is lifted over a distance that is greater than predetermined value "L1", fuel can also flow from the fuel cavity to the second set of orifices through a fuel passage created between the outer tapered annular surface of the needle and the lower tapered inside shoulder of the nozzle.

In another embodiment of the fuel injection valve that includes a nozzle with two sets of injection orifices, the nozzle can include a bore that is fluidly connected with the second set of orifices and the cross-sectional dimension of the bore is matched to fit with the cross-sectional dimension of the needle, such that when the valve member is seated, an outside surface of the needle is in contact with an inside surface of the bore over a predetermined distance "L2" and when the valve member is lifted over a distance that is greater than the sum of distance "L1" and distance "L2", fuel can also flow from the fuel cavity to the second set of orifices.

In a preferred embodiment the large displacement actuator and the small displacement actuator are arranged in series whereby the displacement generated by the large displacement actuator is transmitted through the small displacement actuator to the valve member. In such embodiments, the large displacement actuator is, for example, operable to move a support which holds the small displacement actuator to thereby move the valve member which is in contact with the small displacement actuator between a closed position and an open position.

In yet another embodiment, the present fuel injection valve includes an amplifier associated with the small displacement actuator, whereby movements of the valve member are greater than movements originating from the small displacement actuator. The amplifier can be a hydraulic device including a first displacement member and a second displacement member having a smaller area transverse to a direction of actuation than the first displacement member, each displacement member being associated with a hydraulic chamber, whereby movement of the first displacement member causes a larger movement of the second displacement member and therefore a larger lift of the valve member.

In other embodiments, the amplifier can include a lever interposed between the small displacement actuator and the valve member whereby movements of the valve member are greater than movements originating from the small displacement actuator.

BRIEF DESCRIPTION OF THE DRAWINGS

FIG. 2A shows a method of injecting fuel in two separate injection events corresponding to the sequential and distinct activation of the small displacement actuator and of the large displacement actuator;

FIG. 2B shows a method of injecting fuel in one injection event at a variable mass flow rate which can be controlled by the sequential activation of the small displacement actuator and of the large displacement actuator;

FIG. 2C shows a method of injecting fuel by activating both the small displacement actuator and the large displacement actuator at the same time to achieve a fast initial lift of the valve member.

FIG. 5A shows a detail sectional view of the end part of valve member of the fuel injection valve illustrated in FIG. 5.

FIG. 5B shows a detail sectional view of another embodiment of the end part of the valve member illustrated in FIG. 5 that includes a match fit between the needle part of the valve member and the nozzle.

FIG. 7A shows a detail sectional view of a hydraulic amplifier illustrated in FIG. 7.

FIG. 7B illustrates a detail sectional view of another embodiment of the hydraulic amplifier provided with radial hydraulic channels.

DETAILED DESCRIPTION OF PREFERRED EMBODIMENT(S)

In the illustrated embodiments, the fuel injection valve is a "directly actuated valve" meaning that displacements caused by each of the actuators causes a directly corresponding movement of the valve member. This is to distinguish directly actuated valves from electro-hydraulically actuated fuel injection valves, which use a control valve to control the pressure of a hydraulic fluid in a control chamber so that the pressure of the hydraulic fluid in the control chamber determines the position of the valve member. With a directly actuated valve the displacement produced by the actuator can be transmitted to the valve member by transmission elements, with or without amplification, with a directly actuated valve as defined herein. The lift of the valve member is directly proportional to the actuator displacement. While these directly actuated arrangements are preferred embodiments, the same concept disclosed herein can be used to achieve the same range of flow areas by substituting different types of actuators. For example, the large displacement actuator could be electro-hydraulic, mechanical (for example, using cams), or electro-pneumatic, instead of an electromagnetic actuator.

Depending upon the design of the engine, the fuel injection valve can be disposed within the cylinder head with the valve nozzle protruding into the combustion chamber such that fuel is injected directly into the combustion chamber or, in other engines, the fuel injection valve can be positioned such that it injects fuel into an intake port associated with a combustion chamber, or into the air intake manifold. The disclosed embodiments of the fuel injection valve can be employed with the above arrangements.

Compared to conventional fuel injection valves that use only one actuator, the disclosed fuel injection valve is capable of achieving a broader range of flow areas, enabling the same fuel injection valve to inject two different fuels with substantially different mass densities. This broader range of flow areas can also be useful for fuel injection valves that inject only one fuel, for example when there is a large difference between the amount of fuel needed at idle and at peak load, or when the fuel is used in different amounts for different purposes, for example, when the fuel can be used in very small amounts as a pilot fuel or in larger amounts as the main fuel.

To simplify the illustration of the internal fluid passages within the fuel injection valves, some of the schematic illustrations in the figures show fuel injection valves with a side entry fuel inlet. In an actual working arrangement other internal fluid passages can be employed within the valve body in an operatively equivalent structure.

Figure 1:
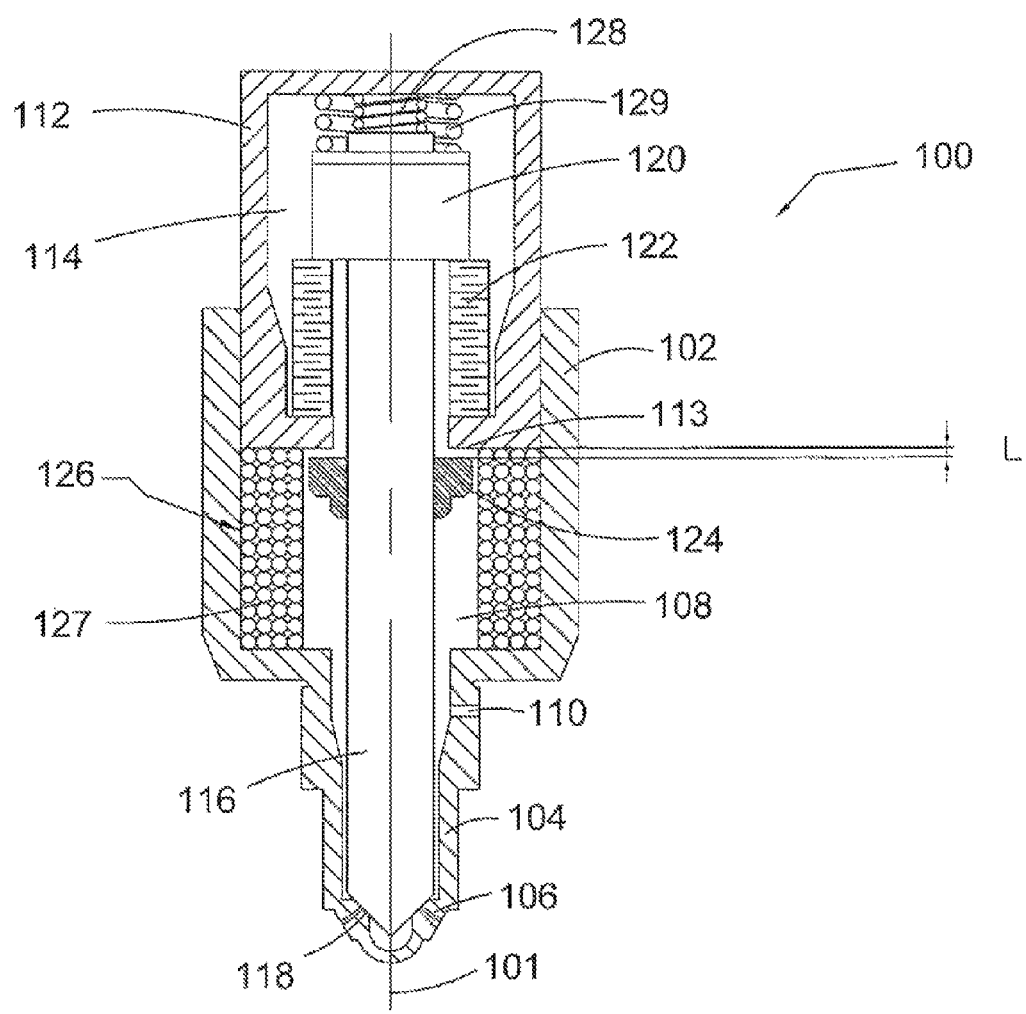
FIG. 1 is a schematic sectional view of a first embodiment of the proposed fuel injection valve illustrating an actuator assembly including a large displacement actuator and a small displacement actuator, each arranged for directly moving the valve member between an open and a closed position.

FIG. 1 shows a schematic sectional view of a first embodiment of a fuel injection valve including an actuator assembly including large displacement actuator 126 and small displacement actuator 122 for directly moving the valve member between an open and a closed position. Fuel injection valve 100 includes lower valve body 102 which defines nozzle 104. Nozzle 104 has fuel injection orifices 106 through which fuel is injected. Lower valve body 102 defines fuel cavity 108 and has fuel inlet 110 for supplying fuel from a common rail to fuel cavity 108. Fuel injection valve 100 also includes upper valve body 112 which defines upper cavity 114. While upper valve body 112 is portrayed as a single piece, it can be made of a plurality of pieces assembled together to facilitate assembly of the valve components within the valve body.

Valve 100 further includes valve member 116 which can move inward within lower valve body 102 lifting away from valve seat 118 to open nozzle orifices 106 for injecting fuel from fuel cavity 108. Valve member 116 includes enlarged portion 120 which is in contact with small displacement actuator 122 when valve member 116 is seated as illustrated in FIG. 1. Large displacement actuator 126 is illustrated as an electromagnetic actuator which includes coil 127 and armature 124 which is rigidly affixed to valve member 116. Valve member 116 is biased to its closed position by a biasing mechanism, such as spring 128, which provides a closing force that pushes valve member 116 into sealed contact with valve seat 118 when small displacement actuator 122 and large displacement actuator 126 are not activated. Spring 129 is disposed between upper valve body 112 and enlarged portion 120 of valve member 116 to apply a compression force to keep valve member 116 in contact with small displacement actuator 122.

In FIG. 1 coil 127 is located in fuel cavity 108 within the annular space provided around valve member 116. Further, small displacement actuator 122 has a tubular shape and is located in upper cavity 114, around valve member 116. Small displacement actuator 122 can include a transducer selected from the group including piezoelectric, magnetostrictive, and electrostrictive transducers or it can include an electroactive polymer, a shape memory alloy or rheological fluid. In one embodiment, both small displacement actuator 122 and large displacement actuator 126 are coaxial with valve member 116, sharing common axis 101.

Enlarged portion 120 can include a hydraulic link assembly (not shown) which operates as described in co-owned U.S. Pat. No. 6,298,829. The hydraulic link includes a piston disposed within a cylinder that is filled with a hydraulic fluid. The opening and closing forces from the strain-type actuator are transmitted to the valve member through the hydraulic fluid that is trapped between the planar surfaces of the piston and the head or base of the hydraulic cylinder. In the time between injection events, the thickness of the hydraulic fluid trapped between the piston and cylinder head or base is automatically adjustable in response to changes in the dimensional relationship between components of the injection valve. By compensating for changes in the dimensional relationship between the components of the injection valve that can be caused, for example, by thermal changes, wear or other factors, the injection valve can maintain a desired valve needle lift when small displacement actuator 122 is activated.

Fuel injection valve 100 operates as follows. When small displacement actuator 122 is activated, it expands in length and moves valve member 116 against the force of spring 128 along longitudinal axis 101 and away from seat 118 such that fuel from fuel cavity 108 can pass through a flow passage created between valve member 116 and valve seat 118 and can be injected through nozzle orifices 106. When small displacement actuator 122 is deactivated it returns to its original length and valve member 116 is pushed by the force of spring 128 towards valve seat 118 to close the valve. In the illustrated embodiment, the displacement of small displacement actuator 122 is substantially the same as the displacement of valve member 116 and therefore the same as the valve lift. The "valve lift" is defined herein as the displacement of the valve member away from a closed/seated position to an open position.

For achieving larger fluid flow areas, such as when operating at a higher load or when operating the engine with a fuel with a lower density, large displacement actuator 126 is activated. The electromagnetic field generated by activating coil 127 of large displacement actuator 126 moves armature 124 which is rigidly affixed to valve member 116 and hence moves valve member 116 along its longitudinal axis, away from seat 118, allowing fuel to pass through a flow passage created between valve member 116 and valve seat 118 to be injected through nozzle orifices 106. As illustrated in FIG. 1 gap, "L", provided between armature 124 and base 113 of upper valve body 112, allows the movement of valve member 116 along its longitudinal axis until armature 124 comes into contact with base 113 of upper valve body 112 which acts as a stop. In this embodiment, gap "L" is predetermined when the fuel injection valve is designed to match the lift required to work in combination with other control parameters, like pulse width and fuel pressure to achieve the fuel mass flow rate required for engine operating conditions, such as when the engine operates at peak load and/or with a lower density fuel.

Different methods for operating the fuel injection valve described herein are illustrated in FIGS. 2A through 2C, which show timing diagrams of fuel injection events correlated with the activation signals for actuators 122 and 126. In these diagrams, the vertical axis represents the valve lift for the lower bars. The commanded activation signals are also shown overlaid on the same time scale. With reference to FIG. 2A, a small displacement actuator is controlled by activation signal 204A and a large displacement actuator is controlled by activation signal 205A. Activation signals 204A and 205A, are shown as raised plateaus above respective horizontal baselines 201A and 202A that represent times when no activation signal is sent to the respective actuators. A first injection event 203A is achieved by sending activation signal 204A to the small displacement actuator to thereby lift the valve member to a first open position and achieve a first fluid flow area of the injection valve. Some of the small displacement actuators, such as the strain-type actuators, can be controlled to expand or retract to different intermediate positions. Through this expansion and retraction, the lift of the valve member during injection event 203A can be varied to vary the flow area of the fuel injection valve. When the desired amount of fuel has been injected, the small displacement actuator is deactivated and the valve member returns to its seated position. When a larger fluid flow area is required than that which can be achieved by activating the small displacement actuator, the large displacement actuator is activated by sending activation signal 205A to the large displacement actuator to generate a separate fuel injection event 206A. With some of the large displacement actuators, such as the electromagnetic actuators, it is difficult to control the movement of the armature to shape the displacement profile or to achieve different intermediate lifts of the valve member. Therefore, in many cases, the fuel mass flow rate injected during injection event 206A is not varied and the lift profile for the valve member displacement is generally rectangular. However, the electromagnetic actuators can deliver displacements of greater magnitude compared to strain-type actuators for example. For example, in one embodiment, activation signal 204A is sent to a small displacement actuator for a bi-fuel injection valve when the engine is fuelled with a liquid fuel, like gasoline or diesel. When the same fuel injection valve is employed to introduce a gaseous fuel which has a much lower mass density, activation signal 206A is sent to a large displacement actuator to achieve a fluid flow area that is at least 15 times greater compared to the fluid flow area when activation signal 204A is sent.

The embodiments described can operate as illustrated in FIG. 2A.

The disclosed fuel injection valve in the embodiments described herein can also operate with a variable flow area during one injection event as illustrated in FIG. 2B which shows a timing diagram of the fuel injection lift profile overlaid with the activation signal for the two different actuators. A smaller fuel mass flow rate at the beginning of a fuel injection event is enabled during first part 203B of the injection event by activating the small displacement actuator with activation signal 204B thereby lifting the valve member to a first position associated with a first flow area. If a higher flow area is needed, activation signal 205B is sent to the large displacement actuator such that the valve member is further lifted to a second position which opens more flow area to enable more fuel flow through the fuel injection valve during part 206B of the injection event. In this example there is no time lag between the deactivation of the small displacement actuator and the activation of the large displacement actuator which allows a continuous flow of fuel through the fuel injection valve when transitioning from first part 203B of the injection event to second part 206B.

In some situations, it is preferred to actuate the large displacement actuator before deactivating the small displacement actuator. An advantage of combining two different types of actuators in one fuel injection valve, more specifically a small displacement actuator such as the strain-type actuator and a large displacement actuator, such as an electromagnetic actuator, is the benefits that can be realized by utilizing the different properties of each type of actuator. As mentioned already, compared to strain-type actuators, electromagnetic actuators can deliver displacements of much greater magnitude, whereas for initiating the opening of the fuel injection valve, compared to electromagnetic actuators, strain-type actuators can deliver more lift force with a smaller sized actuator while using less energy. Also, compared to electromagnetic actuators, strain-type actuators can be controlled to deliver intermediate displacements and the speed of actuation is quick enough to allow shaping the profile of displacement within the timing of an injection event. With some embodiments, these characteristics also allow strain-type actuators to be used to make small adjustments to the lift profile so that the actual lift profile can be influenced to match the desired lift profile, which is not possible for fuel injection valves directly actuated by electromagnetic actuators alone.

The various embodiments of the fuel injection valve can also operate such that the small displacement actuator and the large displacement actuator are activated at the same time as illustrated in FIG. 2C. The fuel injection event includes part 203C when the small displacement actuator is activated for a short period of time through activation signal 204C and part 206C when the large displacement actuator is activated for a longer period of time by activation signal 205C. The small lift achieved by activating the small displacement actuator is enough to generate a fast initial lift of the valve member because of the relatively high opening forces that can be generated for example by a strain-type actuator, and the large displacement actuator lifts the valve member to the desired open position. The valve response time achieved when activating both the small displacement actuator and the large displacement actuator at the same time is thereby improved.

In either of the two methods illustrated in FIGS. 2A and 2B, the order in which the two actuators are activated can be changed, to have, for example, a first injection event with a larger flow area, by activating the large displacement actuator and then having a second injection event with a smaller flow area by activating the small displacement actuator. During an engine cycle, fuel can be injected in several successive injection events and the required flow area and the duration of each injection event can be adjusted according to the engine conditions, load demand and fuel composition.

Figure 3:
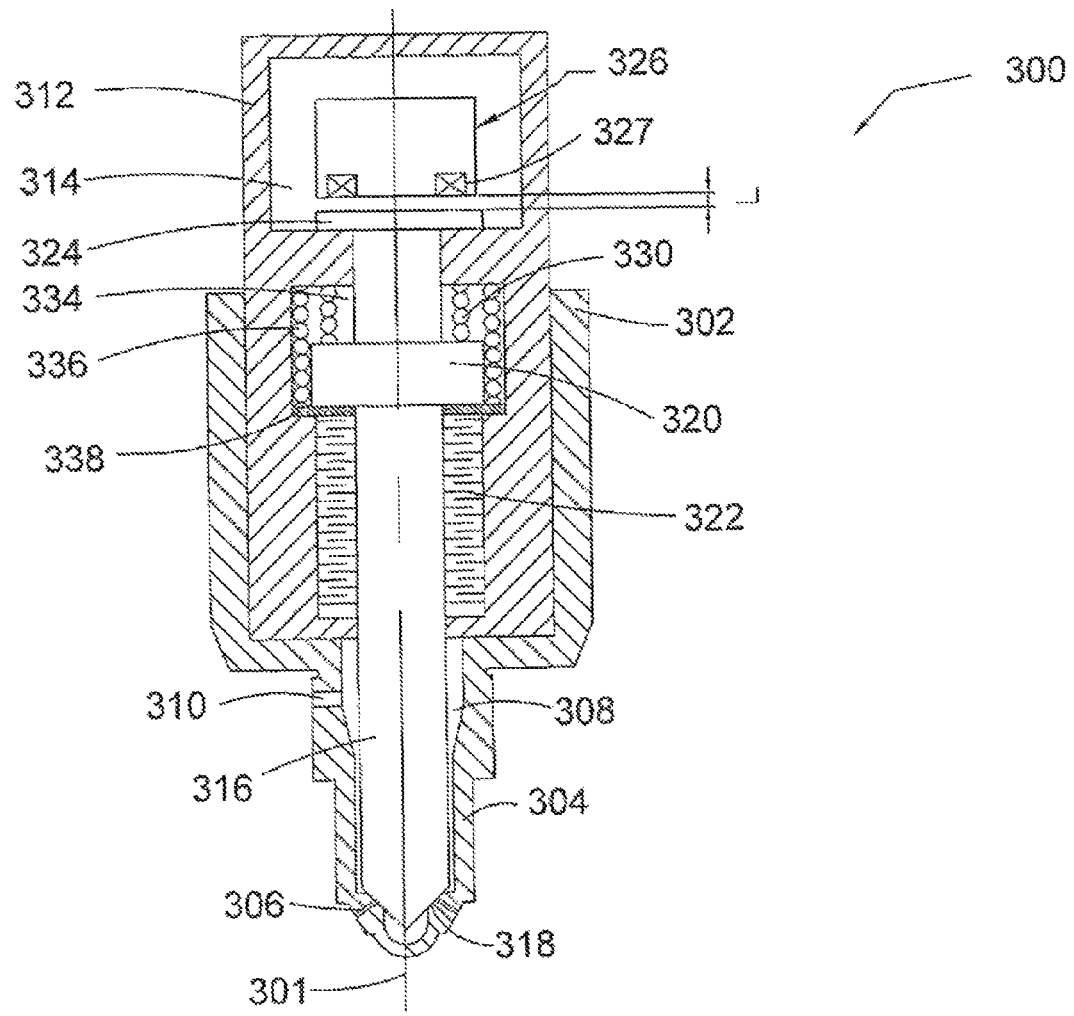
FIG. 3 shows a schematic sectional view of a second embodiment of the proposed fuel injection valve which is actuated by an actuator assembly including a different arrangement of the small displacement actuator and the large displacement actuator.
Figure 4:
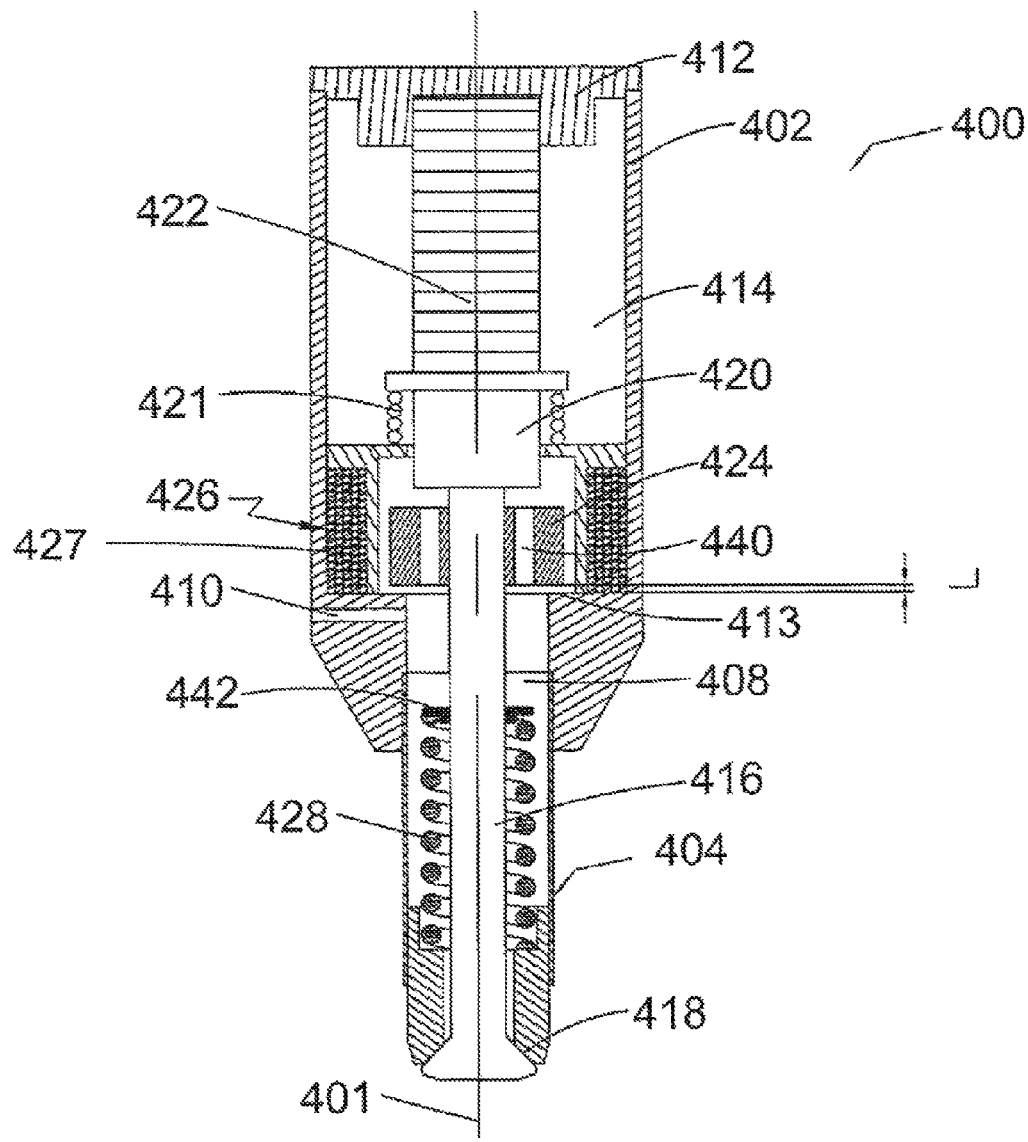
FIG. 4 shows a schematic sectional view of third embodiment of the proposed fuel injection valve including an outward opening valve member and a corresponding arrangement of the large displacement actuator and the small displacement actuator.
Figure 5:
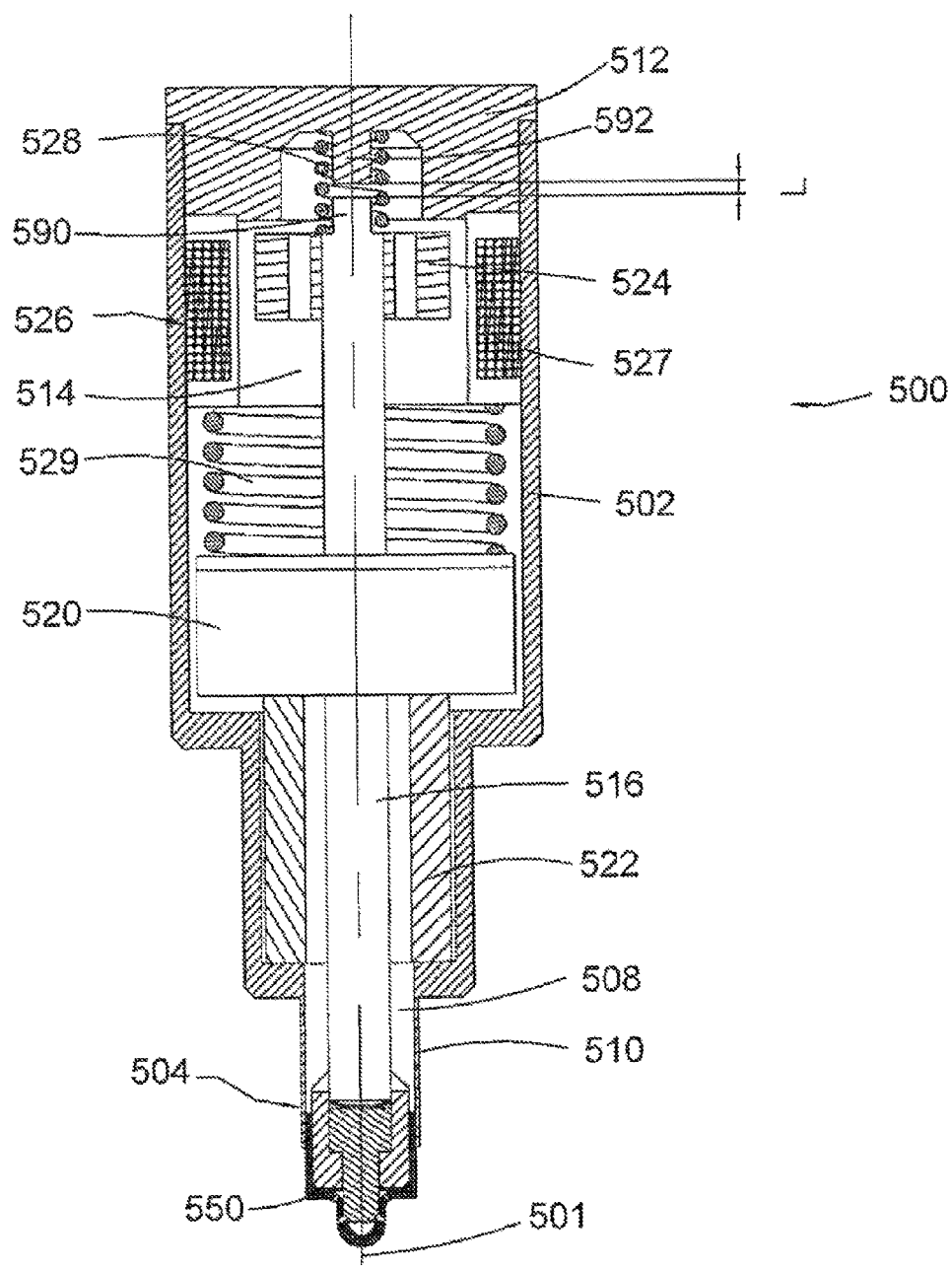
FIG. 5 shows a schematic sectional view of a fourth embodiment of the proposed fuel injection valve including a nozzle provided with two sets of injection orifices for injecting fuel in two stages and yet another arrangement of the actuator assembly including an large displacement actuator and a small displacement actuator.

Other embodiments of the fuel injection valve are illustrated in FIGS. 3 to 5. These embodiments have components that are equivalent to like components presented in FIG. 1 and are identified by like reference numbers. In this disclosure like-numbered components function in substantially the same way in each embodiment. Accordingly, if like components have already been described with respect to one embodiment, while identified in the figures for other embodiments, the purpose and function of like components may not be repeated for each of the illustrated embodiments.

FIG. 3 illustrates a schematic sectional view of a second embodiment of the proposed fuel injection valve. Fuel injection valve 300 includes lower valve body 302, which defines valve nozzle 304, provided with nozzle orifices 306, and fuel cavity 308, provided with fuel inlet 310. The valve body further includes upper valve body 312 which defines upper cavity 314. Valve 300 further includes valve member 316 provided with enlarged portion 320. Valve member 316 is operable to move between a closed position when it is pressed against seat 318 which is part of lower valve body 302 and an open position when it is lifted away from seat 318 to allow fuel flow through orifices 306. Valve 300 is actuated by an actuator assembly including small displacement actuator 322 and large displacement actuator 326 which can be an electromagnetic actuator which includes coil 327 and armature 324. When large displacement actuator 326 is activated, the electromagnetic field generated by coil 327, moves armature 324, which is rigidly affixed to valve member 316, against the force of spring 330. In this embodiment, spring 330, placed within cavity 334 of upper valve body 312, pushes against enlarged portion 320 of valve member 316 to provide the closing force that keeps valve member 316 seated in valve seat 318 when actuators 322 and 326 are not activated. Cavity 334 further accommodates another spring 336 which pushes against plate 338 to keep it in close contact with small displacement actuator 322. Both small displacement actuator 322 and large displacement actuator 326 are coaxial with valve member 316 and therefore share common axis 301. Small displacement actuator 322 can be a strain-type actuator that can include a transducer selected from the group including piezoelectric, magnetostrictive, and electrostrictive transducers. While strain-type actuators are described as the preferred type of actuator for small displacement actuator 322, other actuators that deliver small displacements can be substituted if they are able to deliver the magnitude of displacement and necessary speed of actuation to achieve the lower end of the flow area range. For example certain types of shape memory alloys, electroactive polymers, and electro- or magneto-rheological fluids can be used as small displacement 322. Small displacement actuator 322 can also be an electromagnetic actuator that can generate displacements in the order of at least four times smaller than the displacements generated by the large displacement actuator.

Valve 300 operates as follows. When small displacement actuator 322 is activated, it expands in length and pushes plate 338 against the force of spring 336 so that it comes into contact with enlarged portion 320 of valve member 316 and lifts valve member 316 from its seated position to achieve a first fluid flow area between valve member 316 and valve seat 318 and to inject fuel through nozzle orifices 306. When small displacement actuator 322 is de-activated valve member 316 is pushed to its seated position by spring 330 to stop the fuel injection. Similar to the embodiment of FIG. 1, enlarged portion 320 can include a hydraulic link assembly.

When a larger flow area is needed, large displacement actuator 326 is activated. The electromagnetic field generated by coil 327 upon actuation moves armature 324 which is rigidly affixed to valve member 316 and thereby lifts valve member 316 from its seated position. Large displacement actuator 326 can generate bigger lifts of valve member 316 up to lift "L" (the distance between the housing for coil 327 and armature 324). The geometry of fuel injection valve 300 is chosen to set "L" to a predetermined value that achieves the lift required to work in combination with other control parameters like pulse width and fuel pressure to deliver the desired fuel mass flow rate for engine operating conditions, including when the fuel with the lowest mass density is injected when operating at peak load.

Using the actuator assembly illustrated in FIG. 3, valve member 316 can be lifted by small displacement actuator 322 to a first position that allows a first fuel flow area between valve member 316 and valve seat 318. The lift of valve member 316 in this first position can be controlled to vary the flow area by controlling the expansion of small displacement actuator 322. When small displacement actuator 322 is de-activated valve member 316 returns to its seated position. Then a separate injection event can be generated by activating large displacement actuator 326 to achieve a higher lift and a higher flow area. This method of operating valve 300 is similar to the one illustrated in FIG. 2A.

Alternatively, valve 300 can operate as illustrated in FIG. 2B or as illustrated in FIG. 2C.

FIG. 4 illustrates a schematic sectional view of another embodiment of the fuel injection valve. The body of fuel injection valve 400 includes lower valve body 402, cap 412 and nozzle 404. Nozzle 404 can be made from two pieces fitted together with lower valve body 402, as illustrated in FIG. 4, or it can have a mono-bloc construction. Injection valve 400 further includes valve member 416 which can move outward from valve body 400 to inject fuel through the flow passage created between valve member 416 and valve seat 418. Lower valve body 402 defines upper cavity 414 and is provided with fuel inlet 410 for supplying fuel from a common rail to fuel cavity 408 inside fuel injection valve 400. In this embodiment fuel cavity 408 is defined by lower valve body 402 and nozzle 404. Upper cavity 414 is in fluid communication with fuel cavity 408 and therefore fuel inlet 410 could be placed on the valve body such that it is in direct fluid communication with upper cavity 414 instead of being placed in direct fluid communication with fuel cavity 408 as illustrated in FIG. 4.

The actuator assembly for pushing valve member 416 away from valve seat 418 includes small displacement actuator 422 and large displacement actuator 426, which are both placed within upper cavity 414. Small displacement actuator 422 is in contact with enlarged portion 420 of valve member 416 and, when activated, pushes valve member 416 away from its seat. Large displacement actuator 426 can be an electromagnetic actuator which includes coil 427, which, when activated, moves armature 424 which is rigidly affixed to valve member 416, thereby moving valve member 416 away from valve seat 418. Armature 424 can be provided with passages 440 to allow a better fluid communication between upper cavity 414 and fuel cavity 408. Both small displacement actuator 422 and large displacement actuator 426 are coaxial with valve member 416 and therefore share common axis 401.

Enlarged portion 420 can include a hydraulic link assembly. Spring 421 keeps the hydraulic link assembly in contact with small displacement actuator 422.

Fuel injection valve 400 operates as follows. When both actuators 422 and 426 are deactivated valve member 416 is pushed to its closed position by a biasing mechanism. In one embodiment spring 428 provides a closing force that acts on plate 442 which is rigidly affixed with valve member 416. When small displacement actuator 422 is activated, it expands in length thereby acting on enlarged portion 420 of valve member 416 to push it to its open position and to achieve a first fluid flow area between valve member 416 and valve seat 418 for injecting fuel. The displacement of small displacement actuator 422 is converted into a direct lift of valve member 416 which can be controlled by varying the excitation current delivered to small displacement actuator 422. When small displacement actuator 422 is deactivated it returns to its original length and valve member 416 is pushed by the force of spring 428 towards valve seat 418 to thereby move the valve member in a sealed contact with its valve seat.

For achieving larger fluid flow areas of the valve member, large displacement actuator 426 is activated. The electromagnetic field created by coil 427 moves armature 424 which is rigidly affixed to valve member 416 and thereby moves valve member 416 away from its seat to allow the injection of fuel.

With this geometry ledge 413 acts as a stop limit setting corresponding to distance "L" measured between armature 424 and ledge 413 when valve member 416 is in its seated position.

Fuel injection valve 400 can be operated by independently and separately operating either small displacement actuator 422 or large displacement actuator 426 as illustrated in FIG. 2A. Alternatively, valve 400 can operate as illustrated in FIG. 2B or as illustrated in FIG. 2C.

Another embodiment is shown in FIG. 5. In this embodiment fuel injection valve 500 includes lower valve body 502, cap 512 and nozzle 504. Nozzle 504 can include a separate piece 550 fitted to the valve body as illustrated in FIG. 5 or it can be entirely defined by the valve body. Lower valve body 502 includes a fuel cavity 508 and is provided with a fuel inlet 510 for supplying fuel from a common rail to fuel cavity 508. Lower valve body 502 is assembled with cap 512 to define an upper cavity 514.

Valve 500 also includes valve member 516 which can move inward within the valve body. The constructional details of the end of valve member 516 that contacts the valve seat are better shown in FIG. 5A. Another embodiment showing an alternative construction of the end of valve member 516 is illustrated in FIG. 5B. As shown in FIG. 5, valve member 516 includes an enlarged portion 520 which is in contact with small displacement actuator 522 when valve member 516 is seated. Armature 524 of large displacement actuator 526 illustrated in FIG. 5 as an electromagnetic actuator is rigidly affixed to valve member 516. Valve member 516 is biased in its closed position by a biasing mechanism, which is shown in the illustrated embodiment as spring 528 which is interposed between cap 512 and a shoulder of valve member 516. Another biasing mechanism in the form of spring 529 is placed between the housing of coil 527 and enlarged portion 520, providing the force necessary for keeping valve member 516 in contact with small displacement actuator 522. Spring 528 provides the closing force that pushes valve member 516 against the valve seat when large displacement actuator 526 and small displacement actuator 522 are not activated. In the illustrated embodiment large displacement actuator 526 is placed in upper cavity 514 and small displacement actuator 522 is placed in fuel cavity 508. Both actuators are coaxial with valve member 516 and therefore share a common axis 501. A co-axial arrangement provides a compact design for incorporating two actuators in one valve assembly. A compact design is beneficial because with many modern engines that have a plurality of intake and exhaust valves, and glow plugs or spark plugs in addition to the fuel injection valve there is not a lot of free space in the cylinder head above the combustion chamber. The co-axial arrangement also results in the actuators, which are each independently operable, delivering a balanced opening force to the valve member which is preferable for reliable and durable operation over the lifetime of the fuel injection valve.

In the embodiments illustrated in FIGS. 5, 5A and 5B nozzle piece 550 and respectively 550B are provided with two sets of orifices 552, 554 and respectively 552B, 554B. This allows a two stage injection of fuel, for example, a first injection stage when fuel is injected only through orifices 552 and respectively 552B and a second injection stage when fuel is injected through orifices 552 and respectively 552B and also through orifices 554 and respectively 554B.

In FIG. 5 and further detailed in FIG. 5A, end 560 of valve member 516 includes two separate parts, hollow sleeve 562 which is connected to valve member 516 and needle 564 which can slide within sleeve 562. When valve 500 is in its closed position, annular tapered outside surface 568 of sleeve 562 is pressed down on upper tapered inside shoulder 570 of nozzle piece 550 by spring 528 which acts on valve member 516 and thereby closes the fluid communication between fuel cavity 508 and orifices 552. In the valve's closed position needle 564 is pressed down by the force of spring 566 to contact lower tapered inside shoulder 572 of nozzle piece 550 and thereby closes the fluid communication between chamber 580 and orifices 554. When both sleeve 562 and needle 564 are seated respectively on upper tapered inside shoulder 570 and on lower tapered inside shoulder 572 there is a gap "L1" between the two parts 562 and 564 to allow some space for lifting valve member 516 together with sleeve 562 over a small distance such that fuel can be injected through orifices 552 without opening orifices 554 for fuel injection.

The embodiment of the fuel injection valve 500 illustrated in FIGS. 5 and 5A operates as follows. In the first fuel injection stage, when small displacement actuator 522 is activated, it expands in length and thereby moves valve member 516 along its longitudinal axis against the force of spring 528. Sleeve 562 moves together with valve member 516 while annular tapered outside surface 574 of needle 564, under the force of spring 566, remains in contact with lower tapered inside shoulder 572. Sleeve 562 can move in a longitudinal direction along axis 501 over distance "L1" before coming into contact with needle 564. A small lift applied to sleeve 562, equal to or smaller than "L1", is sufficient to create a flow passage between annular tapered outside surface 568 of sleeve 562 and upper tapered inside shoulder 570 of nozzle piece 550 which defines a first fluid flow area between fuel cavity 508 and orifices 552 and allows fuel to be injected through these orifices. If the lift of valve member 516 is equal to or smaller than "L1" no fuel is injected through orifices 554 because needle 564 remains seated on lower tapered inside shoulder 572.

When small displacement actuator 522 is deactivated it returns to its original longitudinal length and the force of spring 528 acts on valve member 516 to push sleeve 562 towards upper tapered inside shoulder 570. When sleeve 562 comes into contact with upper tapered inside shoulder 570 fuel injection through orifices 552 is ended.

If small displacement actuator remains active and continues to expand in length or if large displacement actuator 526 is activated to move valve member 516 over a distance greater than "L1" both sleeve 562 and needle 564 move together with the valve member 516 along longitudinal axis 501. When annular tapered outer surface 574 of needle 564 moves away from lower tapered inside shoulder 572, the fluid communication between chamber 580 and orifices 554 is opened through a passage of a second flow area created between annular tapered outside surface 574 of needle 564 and lower tapered inside shoulder 572 and fuel from fuel cavity 508 which communicates with chamber 580 is injected through both sets of orifices 552 and 554.

The embodiment illustrated in FIGS. 5 and 5A can operate according to the method illustrated in FIG. 2A by injecting fuel in two separate injection events having different mass flow rates, a smaller mass flow rate when fuel is injected only through first set of orifices 552 and a larger mass flow rate when fuel is injected through both sets of orifices 552 and 554. Alternatively, they can operate according to the method illustrated in FIG. 2B in one injection event starting at a first mass flow rate, for example when fuel is injected only through first set of orifices 552 and continuing with an increased second mass flow rate, for example when fuel is injected through both sets of orifices 552 and 554. The embodiment illustrated in FIGS. 5 and 5A can also operate as illustrated in FIG. 2C.

Another embodiment is illustrated in FIG. 5B. The construction of end 560B of valve member 516 is similar with the one illustrated in FIG. 5A with the difference that fluid communication between chamber 580B and orifices 554B is prevented through match fit 572B between needle 564B and bore 576B provided within nozzle piece 550B. The match fit stretches over a length "L2" measured when the fuel injection valve is closed. When valve member 516 is lifted together with sleeve 562B in the longitudinal direction over a distance equal to or smaller than "L1", annular tapered outer surface 568B of sleeve 562B becomes disconnected from the upper tapered inside shoulder 570B of nozzle piece 550B creating a fluid flow passage which defines a first fluid flow area and thereby establishes fluid communication between fuel cavity 508 and fuel chamber 580B to allow fuel injection through orifices 552B. If valve member 516 is further lifted so that its lift is greater than "L1" needle 564B is entrained by sleeve 562B to move in a longitudinal direction along axis 501 and, eventually, when the valve member lift is greater than the sum of "L1" and "L2" the fluid communication between fuel chamber 580B and orifices 554B is established as needle 564B becomes disengaged from its match fit connection with bore 576B creating a flow passage which defines a second fluid flow area. Similar to the embodiment illustrated in FIG. 5A the valve illustrated in FIG. 5B can operate with separate injection events of a set mass flow rate according to the method illustrated in FIG. 2A or with injection events of a variable mass flow rate whereby during one injection event the mass flow rate is increased for example from a set first flow rate to a greater mass flow rate of a set value according to the method illustrated in FIG. 2B. The embodiment illustrated in FIG. 5B can also operate according to the method illustrated in FIG. 2C.

The maximum lift for valve 516 for both embodiments illustrated in FIGS. 5, 5A and 5B is governed by the geometry of the valve components, more specifically by the distance "L" between protrusion 592 of cap 512 and end 590 of valve member 516. Protrusion 592 acts as a stop against the longitudinal movement of valve member 516.

Figure 6:
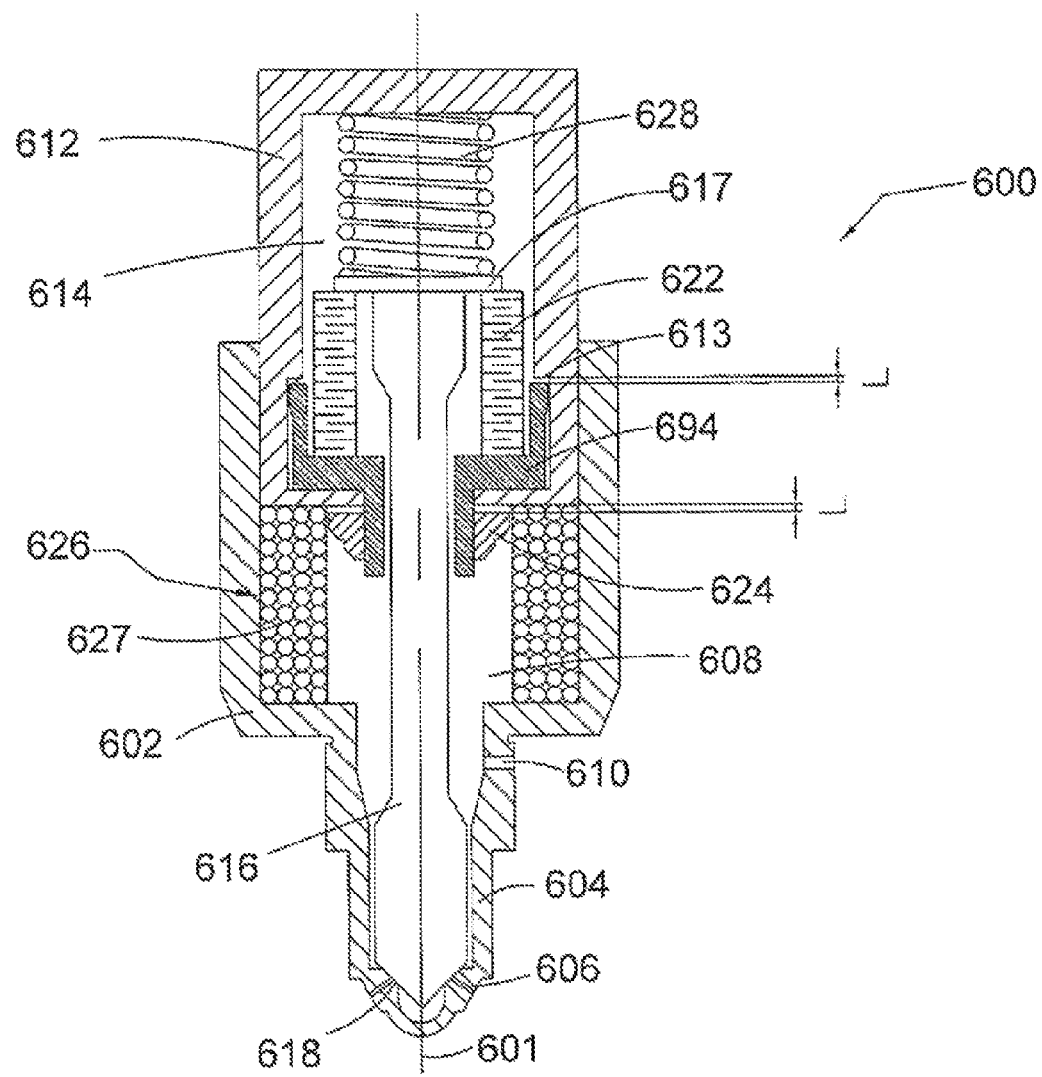
FIG. 6 shows a schematic sectional view of a fifth embodiment of the proposed fuel injection valve including a support for the small displacement actuator which is rigidly affixed to the armature of a large displacement actuator.

Another embodiment is illustrated in FIG. 6. Fuel injection valve 600 includes lower valve body 602 which defines nozzle 604. Nozzle 604 is provided with orifices 606. Lower valve body 602 defines fuel cavity 608 and is provided with fuel inlet 610 for supplying fuel from a common rail to fuel cavity 608. Lower valve body 602 is joined to upper valve body 612 which defines upper cavity 614, and which itself can be made of a plurality of pieces assembled together to facilitate assembly of the different components of valve 600.

Valve 600 also includes valve member 616 which can move inward within the valve body lifting away from valve seat 618 to thereby create a fuel flow passage between valve member 616 and valve seat 618 which defines a fluid flow area and allows injecting fuel through open nozzle orifices 606. Valve member 616 includes enlarged portion 617 which is in contact with small displacement actuator 622 as illustrated in FIG. 6. Large displacement actuator 626 is illustrated as an electromagnetic actuator that includes coil 627 and armature 624 which is rigidly affixed to support 694 which is in contact and supports small displacement actuator 622.

FIG. 6 illustrates a preferred embodiment, but it would be possible for the armature and support to be integrated as a single element, which is functionally equivalent. Valve member 616 is biased to its closed position by a biasing mechanism, such as spring 628, which provides the closing force that pushes valve member 616 into sealed contact with valve seat 618 when small displacement actuator 622 and large displacement actuator 626 are not activated. Spring 628 also provides the force for keeping enlarged portion 617 of valve member 616 in contact with small displacement actuator 622.

In FIG. 6, coil 627 of large displacement actuator 626 is located in fuel cavity 608 within the annular space provided around valve member 616 and small displacement actuator 622 is located in upper cavity 614, around valve member 616. Both small displacement actuator 622 and large displacement actuator 626 are coaxial with valve member 616.

In one embodiment enlarged portion 617 is not adapted to accommodate a hydraulic link assembly and acts only as the portion of the valve member which is in direct contact with the small displacement actuator 622 and through which valve member 616 is lifted.

Fuel injection valve 600 operates as follows. When small displacement actuator 622 is activated, it expands in length thereby moving valve member 616 against the force of spring 628 along longitudinal axis 601 and away from seat 618 creating a flow passage that corresponds to a first fluid flow area such that fuel from fuel cavity 608 can be injected through nozzle orifices 606. When small displacement actuator 622 is deactivated it returns to its original length and valve member 616 is pushed by the force of spring 628 towards valve seat 618 to thereby bring the valve to its closed position.

For achieving larger fluid flow areas, for example when operating at a higher load or when operating the engine with a fuel with a lower density, large displacement actuator 626 is activated. Upon activation, the electromagnetic field generated by coil 627 moves armature 624 which is rigidly affixed to support 694 and thereby lifts small displacement actuator 622 and valve member 616 which rests on the small displacement actuator in a longitudinal direction along axis 601 and away from seat 618 creating a flow passage characterized by a larger fluid flow area and allowing fuel to be injected through nozzle orifices 606. Gap "L," provided between support 694 and upper valve body 612, allows the movement of valve member 616 along its longitudinal axis until support 694 comes into contact with ledge 613 of upper valve body 612 which acts as a stop. The size of gap "L" corresponds to the valve lift that can be achieved by activating large displacement actuator 626. Because armature 624 is rigidly affixed to support 694, the gap formed between armature 624 and upper valve body 612, when valve 600 is in its closed position, is equal to or greater than "L". The maximum valve lift that can be achieved by the valve can be higher than "L" if small displacement actuator 622 is activated at the same time large displacement actuator 626 is activated.

The difference between the embodiment illustrated in FIG. 6 and the one illustrated in FIG. 1 is that the opening forces generated by large displacement actuator 626, when activated, are transmitted to valve member 616 through small displacement actuator 622. Valve member 616 is always in contact with small displacement actuator 622 even when large displacement actuator 622 is activated. In the embodiment illustrated in FIG. 1, when large displacement actuator 126 is activated and lifts valve member 116 from its seat 118, valve member 116 can become disengaged from small displacement actuator 122 and when large displacement actuator 126 is deactivated, valve member 116 descends and restores contact with small displacement actuator 122.

The embodiment illustrated in FIG. 6 can operate according to the method illustrated in FIG. 2A by injecting fuel in two separate injection events having different mass flow rates, a smaller mass flow rate, which corresponds to the first flow area when only the small displacement actuator 622 is activated and a larger mass flow rate, which corresponds to a larger flow area when large displacement actuator 626 is activated alone or in combination with small displacement actuator 622. The valve illustrated in FIG. 6 can also operate according to the method illustrated in FIG. 2B or as illustrated in FIG. 2C.

Figure 7:
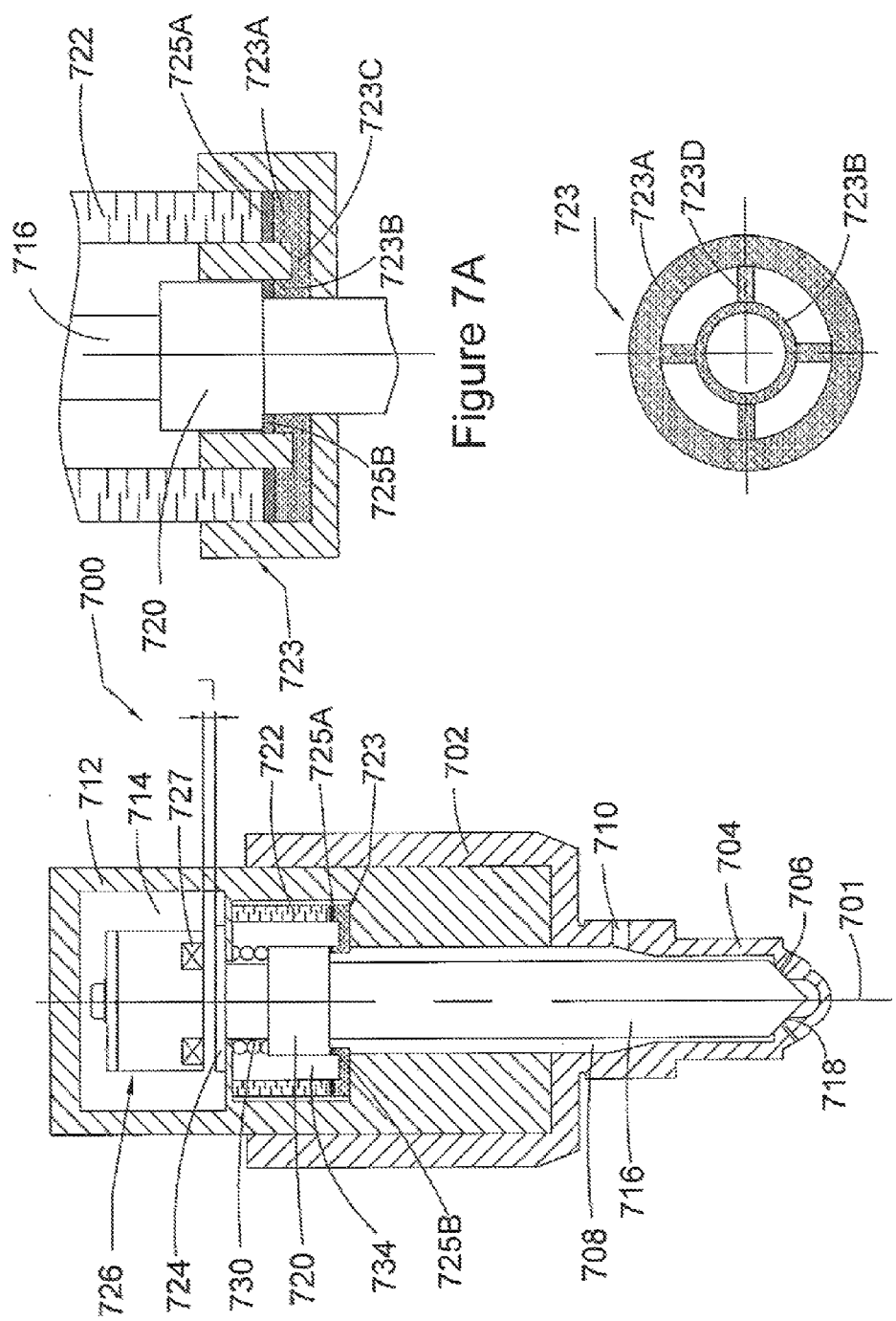
FIG. 7 illustrates a schematic view of another embodiment of the proposed fuel injection valve including a large displacement actuator and a small displacement actuator and further including a hydraulic amplifier.

Another embodiment is schematically illustrated in FIG. 7. Fuel injection valve 700 includes lower valve body 702, which defines valve nozzle 704, provided with fuel injection orifices 706, and fuel cavity 708, provided with fuel inlet 710. Upper valve body 712 defines upper cavity 714. Valve 700 further includes valve member 716 provided with enlarged portion 720. Valve member 716 is operable to move between a closed position when it is seated in seat 718 which is part of lower valve body 702 and an open position when it is lifted away from seat 718 to allow fuel flow through orifices 706. Valve 700 is actuated by an actuator assembly including small displacement actuator 722 and large displacement actuator 726 which, as illustrated, is an electromagnetic actuator including coil 727 and armature 724. The electromagnetic field generated by coil 727 when large displacement actuator 726 is activated, moves armature 724 which is rigidly affixed to valve member 716, and thereby moves valve member 716 against the force of spring 730. In this second embodiment, spring 730, placed within cavity 734 of upper valve body 712, pushes against enlarged portion 720 of valve member 716 to provide the closing force that keeps valve member 716 seated against valve seat 718 when actuators 722 and 726 are not activated.

Valve 700 further includes amplifier 723 which is a hydraulic device including one hydraulic chamber 723A and smaller hydraulic chamber 723B which, in a preferred embodiment illustrated in FIG. 7A, communicate through continuous passage 723C placed at the bottom of amplifier 723 that allows fluid flow between hydraulic chambers 723A and 723B. Each of the hydraulic chambers 723A, 723B is designed to operate as a hydraulic cylinder including respective displacement members 725A and 725B. Passage 723C allows the flow of hydraulic fluid between hydraulic chambers 723A and 723B such that the hydraulic fluid displaced from chamber 723A when displacement member 725A is pushed downwards flows to chamber 723B and pushes displacement member 725B upwards. Displacement members 725A and 725B move within respective hydraulic chambers 723A and 723B similar to a piston in a hydraulic cylinder. In one embodiment passage 723C can include radial hydraulic channels 723D which allow the fluid communication between chambers 723A and 723B as illustrated in FIG. 7B. Both small displacement actuator 722 and large displacement actuator 726 are coaxial with valve member 716 and therefore share longitudinal axis 701.

Valve 700 operates as follows. When small displacement actuator 722 is activated, it expands in length and pushes displacement member 725A downwards within hydraulic chamber 723A. Under the action of displacement member 725A, hydraulic fluid from chamber 723A is displaced and flows into smaller hydraulic chamber 723B pushing displacement member 725B upwards. Because the cross-section of chamber 723A is bigger than the cross-section of chamber 723B, when hydraulic fluid is displaced from chamber 723A to chamber 723B, displacement member 725B moves further than displacement member 725A. Enlarged portion 720 of valve member 716 is kept in direct contact with displacement member 725B by spring 730. Therefore, when displacement member 725B moves upwards it moves valve member 716 from its seated position against the force of spring 730. The lift of valve member 716 achieved by this arrangement is higher than the longitudinal displacement of small displacement actuator 722. The amplification factor achieved by this arrangement is proportional to the ratio between the cross-sectional areas of hydraulic chambers 723A and 723B. When valve member 716 is lifted away from valve seat 718 it creates a fuel passage defining a first fluid flow area.

When small displacement actuator 722 is de-activated valve member 716 is pushed to its seated position by spring 730. Enlarged portion 720 can include a hydraulic link assembly.

When a larger fluid flow area is required, for example when more fuel needs to be injected, large displacement actuator 726 is activated. The electromagnetic field generated by coil 727 when large displacement actuator 726 is activated moves armature 724 which is rigidly affixed to valve member 716 and thereby lifts valve member 716 from its seated position creating a flow passage characterized by a second fluid flow area that is larger than the first fluid flow area. Large displacement actuator 726 can generate a lift of up to gap distance "L" between the housing of coil 727 and armature 724. Gap distance "L" can be a predetermined value that achieves the maximum flow area which can be commanded, for example when the engine operates at high loads or when it is fuelled with gaseous fuel in a bi-fuel engine operation.

Using the present actuator assembly, valve member 716 can be lifted by small displacement actuator 722 to a first position that allows fuel flow through a first flow area and injecting fuel at a first mass flow rate through nozzle orifices 706. The lift of valve member 716 in this first position can be controlled to vary the mass flow rate by controlling the expansion of small displacement actuator 722. When small displacement actuator 722 is de-activated valve member 716 returns to its seated position. Then for injecting fuel at a higher mass flow rate that corresponds to a second fluid flow area large displacement actuator 726 is activated. This method of operating valve 700 is similar to the one illustrated in FIG. 2A.

Like other embodiments, because valve 700 includes two actuators that can be activated independently and separately, other methods of operation can be employed, such as those shown in FIGS. 2B and 2C.

Figure 8:
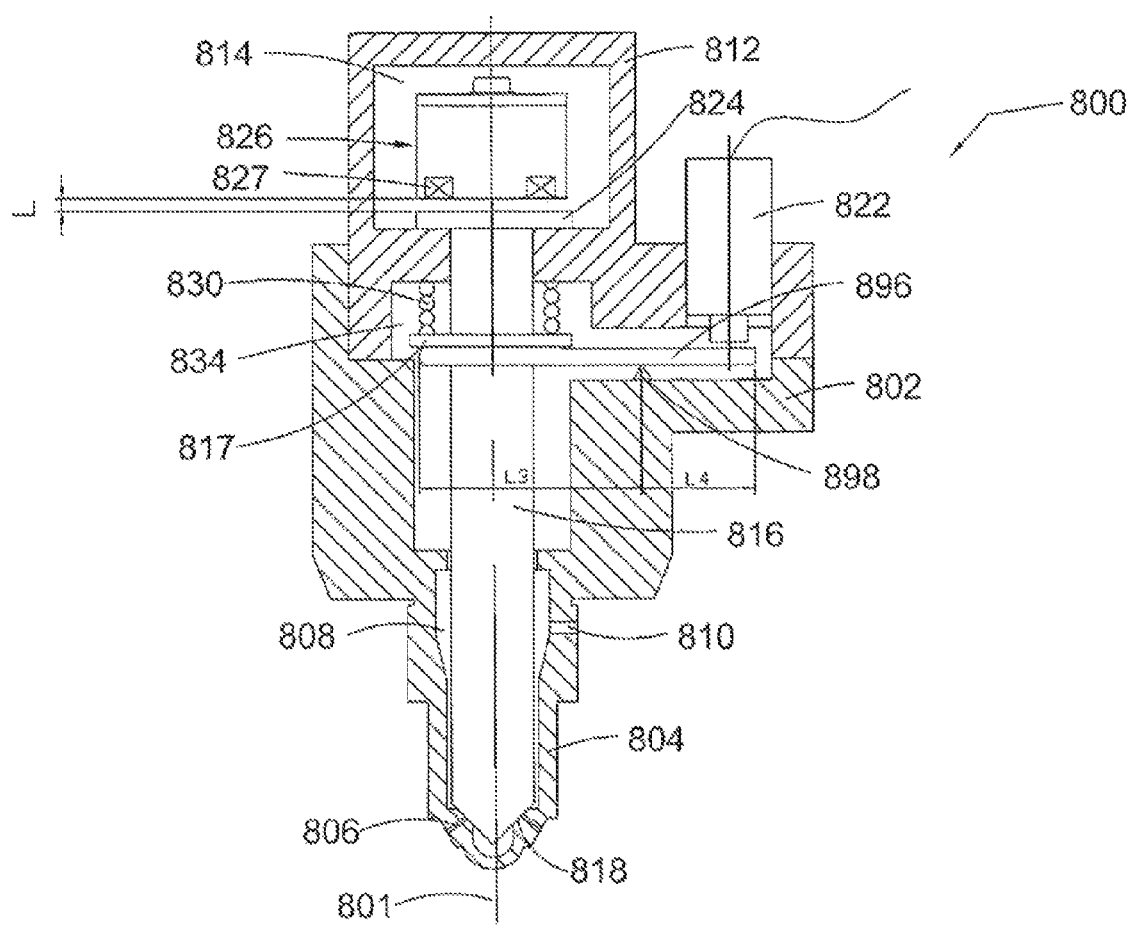
FIG. 8 illustrates a schematic view of another embodiment of the proposed fuel injection valve including a large displacement actuator and a small displacement actuator, and further including a mechanical amplifier.

A further embodiment is illustrated in FIG. 8. Fuel injection valve 800 includes lower valve body 802, which defines valve nozzle 804, provided with nozzle orifices 806, and fuel cavity 808, provided with fuel inlet 810. Upper valve body 812 defines upper cavity 814. Valve 800 further includes valve member 816 which is operable to move between a closed position when it is seated in seat 818 which is part of lower valve body 802 and an open position when it is lifted away from seat 818 to create a flow passage that defines a fluid flow area and allows injecting fuel through orifices 806. Valve 800 is actuated by an actuator assembly including small displacement actuator 822 and large displacement actuator 826 which in this example is an electromagnetic actuator that includes coil 827 and armature 824. The electromagnetic field generated by coil 827 when large displacement actuator 826 is activated moves armature 824, which is rigidly affixed to valve member 816, against the force of spring 830. In this embodiment, spring 830, placed within cavity 834 formed between upper valve body 812 and lower valve body 802, pushes against enlarged portion 817 of valve member 816 to provide the closing force that keeps valve member 816 seated in valve seat 818 when actuators 822 and 826 are not activated.

In this embodiment large displacement actuator 826 is co-axial with valve member 816. Small displacement actuator 822 is placed in an offset position from axis 801 of valve member 816 and, when activated, pushes against lever 896 which is in contact, at its other end, with enlarged portion 817 of valve member 816. The illustration of the lever in this embodiment is schematic and not intended to be a physically accurate depiction. For example, instead of a single lever, a plurality of levers can be positioned radially and equally spaced from each other and the small displacement actuator can be tubular and co-axial with valve member 816. Lever 896 has support 898 which rests on an inside surface of lower valve body 802 as illustrated in FIG. 8. The lift of valve member 816 achieved by this arrangement is higher than the longitudinal displacement of small displacement actuator. The amplification factor between these two values is proportional to the ratio L3:L4 where "L3" is the distance between support 898 and the end of portion of lever 896 that is in contact with enlarged portion 817 and "L4" is the distance between support 898 and the end of the portion of lever 896 that that comes into contact with small displacement actuator 822. In this embodiment, the longitudinal expansion of the small displacement actuator is amplified and results in a higher lift of the valve member, as disclosed in the embodiment illustrated in FIG. 7 only that in this case the amplifier is a mechanical device including lever 896 and support 898.

Valve 800 operates as follows. When small displacement actuator 822 is activated, it expands in length and pushes one end of lever 896 in a downward direction such that the other end of the lever, which is in contact with enlarged portion 817 of valve member 816 is pushed upwards against the force of spring 830, thereby lifting valve member 816 from its seated position and creating a flow passage defining a first fluid flow area. When small displacement actuator 822 is de-activated valve member 816 is pushed to its seated position by spring 830. Enlarged portion 817 of valve member 816 is maintained in contact with lever 896 by the pushing force of spring 830.

When a larger fluid flow area is required, for example when more fuel needs to be injected, large displacement actuator 826 is activated. Coil 827 of large displacement actuator 826, upon actuation, attracts armature 824 which is rigidly affixed to valve member 816 and thereby lifts valve member 816 from its seated position to create a flow passage which defines a second fuel flow area that is larger than the first fluid flow area. The lift generated by large displacement actuator 826 is shown by "L". "L" is the lift that can be achieved by this valve and corresponds, in this embodiment, to the distance between the housing of coil 827 and armature 824. When designing a fuel injection valve for a particular engine, "L" is predetermined to be a value that works in combination with other parameters like pulse width and fuel pressure to achieve the fuel mass flow rate required for all operating conditions including high fuel mass flow rates, for example when the engine operates at high loads or when it is fuelled with a gaseous fuel in a bi-fuel operation of the engine.

FIGS. 1 to 8, being schematic representations of the disclosed fuel injection valve are not drawn to scale. For example, some features can be enlarged relative to other components to better illustrate their function. In addition, these schematic representations do not show physical details such as how the valve's body can be made from more than one piece or how seals or gaskets are employed to ensure that the valve's body is fluid-tight. In the illustrated cross-sections only two injection orifices of the injection valve nozzle are generally shown, but a set of injection orifices typically includes more holes that are distributed, for example, circumferentially at the end of the nozzle which faces the combustion chamber or the air intake manifold.

In the illustrated figures the biasing mechanism for pushing the valve member to a seated position or for keeping the valve member in contact with the strain-type actuator is illustrated as a helical spring. Other types of biasing mechanisms known in the industry can be employed to achieve the same result.

An advantage of the disclosed valves compared to existing actuator arrangements resides in the range of flow areas that can be achieved by employing the embodiments of the actuator assembly described here. The disclosed actuator assembly including a small displacement actuator and a large displacement actuator can achieve a higher range of flow area ratios compared to the existing conventional injector designs. For example, for an actuator assembly employing a solenoid that is dimensioned to achieve a lift of 300 microns and a piezoelectric actuator which can achieve partial lifts of 5-10 microns, the flow area ratio between the maximum flow area achieved by the solenoid and the minimum flow area achieved by the piezoelectric actuator can be much greater than that which conventional fuel injection valves are capable of. The disclosed injection valve can be designed, for example, with at least a 15:1 ratio or an even broader range, such as at least a 20:1 ratio between the highest flow area and the lowest flow area. For bi-fuel engines that use the same fuel injection valve for both liquid and gaseous fuels a ratio between 25:1 and 60:1 is preferred.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A method of actuating a directly actuated fuel injection valve, said method comprising:
   (a) biasing a valve member in a closed position at which fuel flow through said valve is blocked by applying a closing force to said valve member; and
   (b) activating an actuator assembly comprising a large displacement actuator and a small displacement actuator which are each independently operable to produce a lift of said valve member away from a valve seat by:
      (i) commanding said small displacement actuator to directly move said valve member against said closing force to a first open position corresponding to a first flow area, and
      (ii) commanding said large displacement actuator to directly move said valve member against said closing force to a second open position corresponding to a second flow area that is larger than said first flow area, wherein a ratio between said second flow area and said first flow area is at least 15:1.

2. The method of claim 1, further comprising directly moving said valve member to said first open position corresponding to said first flow area when injecting a first fuel and directly moving said valve member to said second open position which corresponds to said second flow area when injecting a second fuel, which has a lower mass density compared to said first fuel.

3. The method of claim 2, wherein said first fuel is a liquid fuel selected from the group consisting of gasoline, diesel fuel, dimethylether, bio-diesel and kerosene; and/or said second fuel is a gaseous fuel selected from the group consisting of natural gas, methane, propane, butane, hydrogen and mixtures thereof.

4. The method of claim 1, further comprising:
(c) transmitting displacements caused by said small displacement actuator to said valve member through a hydraulic link assembly to compensate for changes in the dimensional relationship between components of said fuel injection valve; and/or
(d) transmitting a displacement generated by said large displacement actuator through said small displacement actuator to said valve member; and/or
(e) in a single injection event, first commanding said small displacement actuator to directly move said valve member to said first open position and then commanding said large displacement actuator to move said valve member to said second open position; and/or
(f) injecting a fuel through a first set of orifices provided in a nozzle of said fuel injection valve when said valve member is in said first open position and injecting said fuel through said first set of orifices and through a second set of orifices provided in said nozzle when said valve member is in said second open position; and/or
(g) controlling a duration of an activation time of said small displacement actuator and/or said large displacement actuator to control an injection event duration as a parameter for controlling fuel amount injected during said injection event.

5. The method of claim 1, further comprising:
(c) activating said large displacement actuator after deactivating said small displacement actuator; or
(d) activating said large displacement actuator before deactivating said small displacement actuator; or
(e) activating said small displacement actuator and said large displacement actuator at a same time.

6. The method according to claim 1, wherein said ratio between said second flow area and said first flow area is at least 20:1 or at least 25:1.

7. A directly actuated fuel injection valve comprising:
(a) a valve body that defines a fuel cavity, said valve body comprising an inlet passage for delivering a fuel into said fuel cavity and a nozzle through which said fuel can exit from said fuel cavity;
(b) a valve member disposed within said valve body, wherein said valve member is movable between a closed position wherein said valve member blocks fuel from exiting said fuel cavity through said nozzle and an open position wherein said valve member and said valve body define a fluid flow area through which said fuel can exit said fuel cavity through said nozzle; and
(c) an actuator assembly that moves said valve member between said closed position and said open position, said actuator assembly comprising:

(i) a small displacement actuator that, when activated, directly moves said valve member to a first open position corresponding to a first flow area; and
(ii) a large displacement actuator that, when activated, directly moves said valve member to a second open position corresponding to a second flow area, wherein a ratio between said second flow area and said first flow area is at least 15:1.

8. The fuel injection valve of claim 7, wherein:
(d) said large displacement actuator and said small displacement actuator are arranged co-axially with said valve member; and/or
(e) said large displacement actuator is an electromagnetic actuator which is operable to move an armature which is rigidly affixed to said valve member to thereby move said valve member between said closed position and said second open position; and/or
(f) said small displacement actuator is capable of being activated to produce a displacement that is transmitted directly to said valve member which is thereby moved between said closed position and said first open position; and/or
(g) said small displacement actuator has a tubular shape and is disposed within said valve body, in an annular space surrounding said valve member; and/or
(h) said valve body further comprises a stop that limits movement of said valve member.

9. The fuel injection valve of claim 7, further comprising:
(d) a hydraulic link assembly that is operable to compensate for changes in a dimensional relationship between components of said fuel injection valve; and/or
(e) a biasing mechanism associated with said valve member, said biasing mechanism applying a closing force to said valve member for biasing said valve member into said closed position; or
(f) a biasing mechanism associated with said valve member, said biasing mechanism applying a closing force to said valve member for biasing said valve member into said closed position wherein said biasing mechanism is a spring which is disposed within said valve body between said valve body and said valve member; or
(e) a biasing mechanism for applying a force on said valve member for keeping it in close contact with said small displacement actuator, wherein said biasing mechanism is disposed within said valve body between said valve body and said valve member.

10. The fuel injection valve of claim 7, wherein said nozzle comprises two sets of orifices and wherein said small displacement actuator is operable to directly move said valve member to said first open position that allows injecting fuel from said fuel cavity through a first set of orifices and wherein said large displacement actuator is operable to move said valve member to said second open position that allows injecting fuel from said fuel cavity through said first set of orifices and through a second set of orifices.

11. The fuel injection valve of claim 10, wherein an end of said valve member comprises a hollow sleeve and a needle that is operable to slide within said hollow sleeve.

12. The fuel injection valve of claim 11, wherein said sleeve comprises an annular tapered outside surface and said nozzle comprises an upper tapered inside shoulder, such that when said valve member is seated said annular tapered outside surface of said sleeve is in contact with said upper tapered inside shoulder of said nozzle and when said valve member is lifted over a distance that is smaller than a predetermined lift L1 fuel can flow from said fuel cavity to said first set of orifices through a fuel passage created between said annular tapered outside surface of said sleeve and said upper tapered inside shoulder of said nozzle.

13. The fuel injection valve of claim 12, wherein said needle comprises an outer tapered annular surface and said nozzle comprises a lower tapered inside shoulder and when said valve member is lifted over a distance that is greater than said predetermined value L1 fuel can also flow from said fuel cavity to said second set of orifices through a fuel passage created between said outer tapered annular surface of said needle and said lower tapered inside shoulder of said nozzle.

14. The fuel injection valve of claim 12, wherein said nozzle comprises a bore that is fluidly connected with said second set of orifices and whose cross-sectional dimension is matched to fit with a cross-sectional dimension of said needle such that when said valve member is seated, an outside surface of said needle is in contact with an inside surface of said bore over a predetermined distance L2 and when said valve member is lifted over a distance that is greater than a sum of said distance L1 and said distance L2, fuel can also flow from said fuel cavity to said second set of orifices.

15. A fuel injection valve of claim 7, wherein said large displacement actuator and said small displacement actuator are arranged in series whereby a displacement generated by said large displacement actuator is transmitted through said small displacement actuator to said valve member.

16. A fuel injection valve of claim 15, wherein said large displacement actuator is operable to move a support which holds said small displacement actuator to thereby move said valve member which is in contact with said small displacement actuator between said closed position and said open position.

17. The fuel injection valve of claim 7, further comprising an amplifier associated with said small displacement actuator whereby movements of said valve member are greater than movements originating from said small displacement actuator.

18. The fuel injection valve of claim 17, wherein said amplifier:
    (a) is a hydraulic device comprising a first displacement member and a second displacement member having a smaller area transverse to a direction of actuation, each displacement member being associated with a hydraulic chamber, whereby movement of said first displacement member causes a larger movement of said second displacement member; or
    (b) comprises a lever interposed between said small displacement actuator.

19. The fuel injection valve of claim 7, wherein:
    (a) a displacement generated by said small displacement actuator is at least four times smaller than a displacement generated by said large displacement actuator; and/or
    (b) said small displacement actuator comprises a strain-type actuator that is a transducer selected from the group consisting of piezoelectric, magnetostrictive, and electrostrictive transducers, or it comprises an electroactive polymer, a shape memory alloy or rheological fluid; or
    (c) said large displacement actuator is an electromagnetic actuator such as a solenoid.

20. The fuel injection valve of claim 7, wherein said ratio between said second flow area and said first flow area is at least 20:1 or at least 25:1.

\* \* \* \* \*